US009315341B2

(12) United States Patent
Leist

(10) Patent No.: US 9,315,341 B2
(45) Date of Patent: Apr. 19, 2016

(54) MERGING CONVEYOR

(71) Applicant: Intelligrated Headquarters, LLC, Mason, OH (US)

(72) Inventor: Henry C. Leist, Cincinnati, OH (US)

( * ) Notice: Subject to any disclaimer, the term of this patent is extended or adjusted under 35 U.S.C. 154(b) by 0 days.

(21) Appl. No.: 14/230,947

(22) Filed: Mar. 31, 2014

(65) Prior Publication Data

US 2014/0291117 A1 Oct. 2, 2014

Related U.S. Application Data

(60) Provisional application No. 61/806,912, filed on Mar. 31, 2013.

(51) Int. Cl.
*B65G 47/68* (2006.01)
*B65G 47/31* (2006.01)

(52) U.S. Cl.
CPC .............. *B65G 47/681* (2013.01); *B65G 47/31* (2013.01)

(58) Field of Classification Search
CPC .... B65G 47/31; B65G 47/681; B65G 47/682; B65G 47/72; B65G 47/04; B65G 47/06; B65G 47/08
USPC ......... 198/447, 448, 453, 454, 457.02, 461.1, 198/461.2, 601, 608, 784, 785, 786, 451, 198/452, 458, 418.7
See application file for complete search history.

(56) References Cited

U.S. PATENT DOCUMENTS

| | | | | |
|---|---|---|---|---|
| 1,931,453 A * | 10/1933 | Adams | .................. | B65G 47/681 198/448 |
| 1,931,454 A * | 10/1933 | Anderson | .............. | B65G 13/07 198/448 |
| 1,946,453 A * | 2/1934 | Brodbeck | ................ | B21B 39/00 198/448 |
| 1,946,458 A * | 2/1934 | Evans | ................... | B65G 47/681 193/36 |
| 4,044,897 A * | 8/1977 | Maxted | .................. | B65G 47/71 198/349 |
| 4,181,947 A * | 1/1980 | Krauss | .................... | B65G 47/50 198/349 |
| 5,400,896 A * | 3/1995 | Loomer | .................. | B65G 47/71 198/415 |
| 5,415,281 A * | 5/1995 | Taylor | ................... | B65G 47/682 198/448 |
| 6,170,637 B1 * | 1/2001 | Ishii | ........................ | B65G 47/22 198/443 |

(Continued)

FOREIGN PATENT DOCUMENTS

JP H 06-40546 2/1994

OTHER PUBLICATIONS

International Search Report and Written Opinion dated Aug. 1, 2014 for Application No. PCT/US2014/032383.

*Primary Examiner* — Leslie A Nicholson, III
*Assistant Examiner* — Keith R Campbell

(57) ABSTRACT

A conveyor system has a plurality of infeed staging conveyors configured to selectively feed batches of article arranged in a side by side configuration to a downstream merging conveyor. The merging conveyor is configured to merge batches of articles arranged in a side-by-side configuration and to singulate the individual articles of each batch while merging the batches as the articles are singulated while being advanced downstream as a flow of in-line separated articles. The merging conveyor includes a plurality of laterally spaced lanes of conveying surfaces which having a respective speed and each imparting an inward lateral force on the articles. A descrambling conveyor is disposed downstream of the merging conveyor.

22 Claims, 19 Drawing Sheets

(56) References Cited

U.S. PATENT DOCUMENTS

| | | |
|---|---|---|
| 6,390,277 B2 | 5/2002 | Pelka |
| 6,484,886 B1 * | 11/2002 | Isaacs ................... B65G 43/08 198/368 |
| 6,622,847 B2 | 9/2003 | Schuitema et al. |
| 7,191,894 B2 * | 3/2007 | Costanzo ............... B65G 17/40 198/370.09 |
| 2007/0221475 A1 * | 9/2007 | Halsey ................. B65G 13/071 198/442 |
| 2014/0262686 A1 * | 9/2014 | Schroader ............. B65G 47/22 198/455 |

* cited by examiner

MERGING CONVEYOR

This application claims priority from U.S. Patent Application Ser. No. 61/806,912, filed on Mar. 31, 2013, the entirety of which is incorporated herein by reference.

TECHNICAL FIELD

The present disclosure relates generally to material handling systems, and is more particularly directed to a material handling system and subsystems thereof configured to merge articles received from at least two lanes of conveyed articles into single file, and further configured to receive the conveyed articles grouped together in a side-by-side configuration from either of the at least two lanes and to convert the side-by-side configuration into a single, singulated line of spaced-apart articles exiting from the merge.

The innovation will be disclosed in connection with, but not necessarily limited to, a material handling system in which the conveyed articles in each of the two lanes are identical in length and comprise three articles in a side by side orientation on each lane.

BRIEF DESCRIPTION OF THE FIGURES

The accompanying drawings, which are incorporated in and constitute a part of this specification, illustrate embodiments of the invention, and, together with the general description of the specification given above, and the detailed description of the embodiments given below, serve to explain the principles of the present invention.

Figure 1:
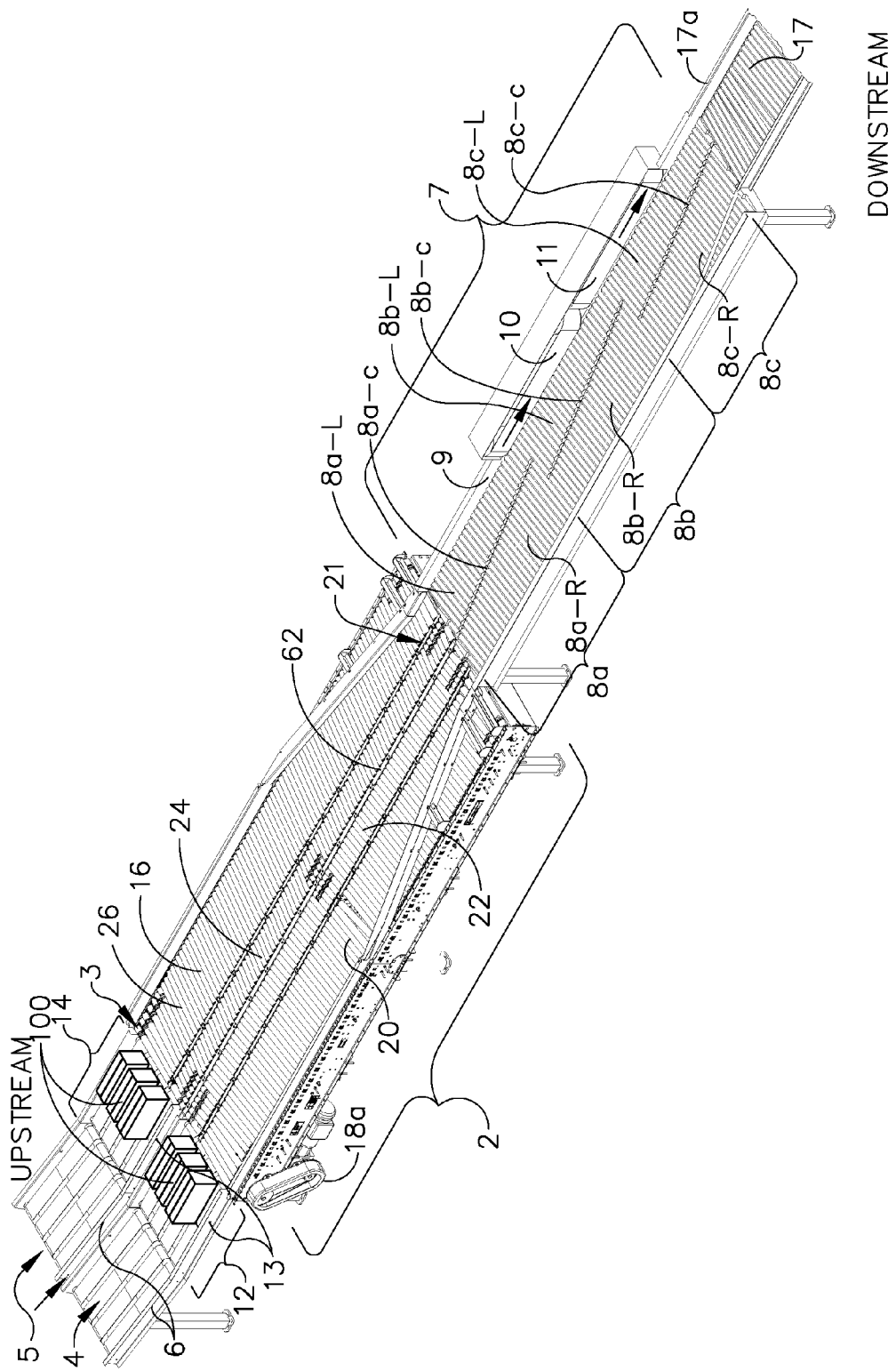
FIG. 1 is a perspective view of a merging conveyor.

Reference will now be made in detail to one or more embodiments illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Referring to FIG. 1, merging conveyor 2 is configured to merge batches of articles arranged in a side-by-side configuration and to singulate the individual articles of each batch while merging the batches as the articles are singulated while being advanced downstream as a flow of in-line separated articles. First lane 4 and second lane 5 feed batches of articles 100 into the infeed or receiving end 3 of merging conveyor 2. As shown, lane 4 feeds into a left side and lane 5 feeds into a right side of merging conveyor 2. In FIG. 1, a portion of first and second lanes 4 and 5 are shown.

Merging conveyor 2 advances articles 100 received from first and second lanes 4, 5 in a longitudinal downstream direction, merges the batches while singulating individual articles 100 of each batch, and discharges articles 100 from discharge end 21 to unscrambler 7. Unscrambler 7 advances articles 100 received from merging conveyor 2 in the downstream longitudinal direction, further singulating any articles 100 discharged by merging conveyor 2 that not been fully singulated, and discharges articles 100 single file on to conveyor 17. Conveyor 17 may comprise a hard skew to drive articles 100 to be edge aligned along side 17a of conveyor 17.

Immediately upstream of receiving end 3 is first infeed conveyor, also referred to herein as a staging conveyor, 12 and second infeed conveyor, also referred to herein as a staging conveyor, 14, which are configured to receive respective batches of articles 100, also referred to herein as cases, for release to merging conveyor 2. In the embodiment depicted, batches comprise three substantially identical cases 100, although the present innovation may be configured to be used with batches containing any suitable number of cases having suitable sizes and shapes relative to each other. Cases 100 can be different sizes from batch to batch. It is desirable that all three cases 100 of a batch be generally uniform in size.

Staging conveyors 12, 14 may be of any suitable configuration defining a conveying surface suitable for staging articles and selectively releasing them to merging conveyor 2. In the embodiment depicted, staging conveyors 12, 14 include a plurality of rollers covered by one or more belts 12a, 14a. Staging conveyors 12, 14, may be driven by any suitable drive arrangement, such as for example utilizing one or more motorized drive roller (MDR). Each staging conveyor 12, 14 can include one or more sensors 13 disposed to sense cases 100 on staging conveyor 12, 14. Sensors 13 may be of any suitable configuration, such as optical sensors, and may be configured to sense lengths of cases 100 or sense whether a batch of cases 100 are disposed on staging conveyor 12, 14. In FIG. 1, the cases 100 are in a position on each staging conveyor 12, 14 whereat optical sensors 13 are respectively blocked. In the embodiment depicted, sensors 13 are disposed nine inches from the end of the conveyors 12, 14, sensing the leading end of cases 100.

Each staging conveyor 12, 14 is configured to receive and hold respective batches of cases 100 arranged in a side by side orientation for release onto merging conveyor 2. Each staging conveyor 12, 14 can be loaded with a respective batch of side-by side cases 100 delivered by the respective lane 4 or 5. One or more sensors 6 may be disposed upstream of staging conveyors 12, 14 to sense cases 100 on lanes 4, 5. Sensors 6 may be of any suitable configuration, such as optical sensors, and may be configured to sense the lengths of cases 100, or sense the presence and location of a batch of cases 100 on staging conveyors 12, 14.

A controller, diagrammatically indicated at 200, may be provided to regulate the timing and sequencing of the releases of batches. Controller 200, which may have one or more processors, comprises at least part of a processing system, which itself may have more than one controller, which executes instructions control the release of cases. The controller which executes such instructions may also control other subsystems of the material handling system. Staging conveyors 12, 14 are controlled to release respective batches of cases 100 in a coordinated manner from their respective discharge ends, timed to produce an appropriate gap between each released batch such that cases of a leading batch will not overlap with cases of a trailing batch as merging conveyor 2 merges the batches while singulating the individual cases of each batch. When a release command is received by a respective staging conveyor 12 or 14, that respective staging conveyor 12 or 14 is activated and releases a first respective batch of side-by-side cases 100 onto merging conveyor 2 for separation and singulation of cases 100, as described below. After the batch of cases 100 is released into merging conveyor 2, the empty staging conveyor 12, 14 can be immediately reloaded from the respective upstream lane 4 or 5. At a suitable time, a second, trailing batch of cases 100 can be released onto merging conveyor such that relative positions between the first, leading batch of cases 100 and the second trailing batch of cases allows merging conveyor 2 to singulate the individual cases 100 of each batch. The timing of the releases may be such that collisions between cases 100 of the leading batch and cases 100 of the trailing batch are avoided. In dependence on the timing of batches being staged on staging conveyors 12, 14, the trailing batch of cases 100 may be released from the same one of the first or second staging conveyors 12, 14, or may be released from the other one of the first or second staging conveyors 12, 14. That is, the batches of side-by-side cases 100 can be released serially from one of the first or second staging conveyors 12, 14, or can be released in a side to side alternating fashion from the first and second staging conveyors 12, 14.

The characteristics of cases 100, such as length and width, affect the mechanics of singulation of cases 100 within each batch and therefore affect the timing of the batch releases. Depending on the size of cases 100 in a batch, merging conveyor 2 can receive merge, separate, and merge up to two or more batches simultaneously. Batches may be timed so that once the first released batch is clear, a second batch may be released to follow right behind. For example, if the case lengths of two or more consecutive batches of cases 100 are short, the release time between batches can be small and more cases 100 can be singulated by the merging conveyor 2. If cases 100 are long, the release time between batch releases may be larger, and fewer cases 100 can be singulated. It is desired to maximize the throughput, which may be considered in case feet per minute units, regardless of the length of cartons. While large inter-batch gaps between successive batches reduce throughput, the inter-batch gaps need to be large enough to avoid non-singulated cases being discharged to downstream systems.

Referring to FIGS. 1-4, which are top plan views of merging conveyor 2 with the upstream, downstream and left and right sides indicated, merging conveyor 2 comprises a plurality of driven rollers 16 that move cases 100 as described herein. In the embodiment depicted, rollers 16 are arranged in four lanes 20, 22, 24, 26 that extend longitudinally along merging conveyor 2, each lane being laterally spaced apart from the other lanes. The left-most two lanes 20, 22 receive cases from first staging conveyor 12 and the right most two lanes 24, 26 receive cases from second staging conveyor 14. The configuration of the four lanes 20, 22, 24, 26 results in the singulation and merging of cases 100 according to their batch grouping into a single file line of cases 100 advancing in the downstream direction.

Each lane 20, 22, 24 26 comprises a respective upper conveying surface which may be defined by any suitable configuration. In the embodiment depicted, lane 20 comprises a plurality of generally identical rollers 16a which extend in the longitudinal direction and which define at least a portion of the upper conveying surface of lane 20; lane 22 comprises a plurality of generally identical rollers 16b which extend in the longitudinal direction and which define at least a portion of the upper conveying surface of lane 22; lane 24 comprises a plurality of generally identical rollers 16c which extend in the longitudinal direction and which define at least a portion of the upper conveying surface of lane 24; and lane 26 comprises a plurality of generally identical rollers 16d which extend in the longitudinal direction and which define at least a portion of the upper conveying surface of lane 26. In embodiment depicted, rollers 16a are dimensionally the same as rollers 16d, and rollers 16b are dimensionally the same as rollers 16c, although such is not required for practice of the present innovation. Lanes 20, 22, 24, 26 may be configured as any suitable width and length, and there may be more than the four lanes shown in the embodiment depicted. Within each lane 20, 22, 24, 26, rollers 16a, 16b, 16c, 16d are substantially the same as the other rollers 16a, 16b, 16c, 16d, differing only by the presence of grooves configured to receive individual drive elements, such as 0-bands, as described below.

Rollers 16a, 16b, 16c, 16d may be driven by any suitable drive arrangement, such as for example driven by including one or more MDRs in the respective groups of rollers 16a, 16b, 16c, 16d. Or, as in the embodiment depicted, rollers 16a, 16b, 16c, 16d may be driven by one or more belts underlying and frictionally engaging rollers 16a, 16b, 16c, 16d. In the embodiment depicted, each lane 20, 22, 24, 26 is driven by its own respective underlying belt (not seen). Such belts may be driven by respective drive pulleys disposed at one end of merging conveyor 2, such as receiving end 3, extending to respective idler pulleys disposed at the other end of merging conveyor 2. One or more driven shafts may drive the drive pulleys. For example, the pulleys of lanes 20, 22 may share a common drive shaft, driven by a conveyor drive unit 18a, with the conveying surface speeds of each lane 20, 22, being determined by the diameter of the respective pulleys for lanes 20, 22, such that a difference in diameters of the pulleys would produce different speeds between lanes 20 and 22. The pulleys of lanes 24, 26 could also share the same common drive shaft as the pulleys of lanes 20, 22, or, as in the embodiment depicted, share their own respective common drive shaft driven by conveyor drive unit 18b. Alternatively, each lane 20, 22, 24, 26 may have its own respective conveyor drive unit.

The upper conveying surface of each lane 20, 22, 24, 26 moves at at least one respective speed and is configured to impart, in additional to longitudinal movement, lateral movement at at least one angle to cases 100. In the embodiment depicted, wherein the respective upper conveying surfaces of each lane 20, 22, 24, 26, are defined by rollers 16a 16b, 16c, 16d, the imparting of lateral movement is effected by rollers 16a, 16b, 16c, 16d being skewed inwardly toward center rail 62 at at least one angle within each lane 20, 22, 24, 26, as described below. Each lane 20, 22, 24, 26 imparting lateral movement at at least one angle and having at least one speed is effective to singulate and merge cases 100.

In the embodiment depicted, each of the upper conveying surfaces of each lane 20, 22, 24, 26 move at different speeds. For example, the following speeds are exemplary:

| LANE | SPEED (FEET PER MINUTE) |
|---|---|
| Lane 20 | 330 |
| Lane 22 | 234 |
| Lane 24 | 227 |
| Lane 26 | 164 |

Referring to FIGS. 1-4, using the exemplary speeds as set forth in the above table, first staging conveyor 12 is configured to release cases 100 on to the two fastest moving lanes 20 and 22, and second staging conveyor 14 is configured to release cases 100 onto the slower running columns 24 and 26. The relative speeds between lanes 20, 22, 24, 26 affects the time intervals at which cases 100 can be released from alternating lanes 4, 5. In this depiction, cases 100 released from first staging conveyor 12 will travel faster on merging conveyor 2 than cases 100 released from staging conveyor 14. As a result of the different lane speeds, a trailing batch can be released sooner from staging conveyor 14 following the release of a leading batch from staging conveyor 12 than can a trailing batch released from staging conveyor 12 following release of a leading batch from staging conveyor 14.

Additionally, if batches of cases 100 are released sequentially from one of first staging conveyor 12 or second staging conveyor 14, the faster moving left hand lanes 20, 22 will be able to advance cases 100 more rapidly than batches released to the slower moving right hand lanes 24, 26. Thus, sequential releases from the left hand staging conveyor 12 can occur more rapidly than sequential releases from the right hand staging conveyor 14.

As mentioned above, physical characteristics of cases 100 affect the mechanics of singulation of cases 100 and merging of batches of cases 100. Although in the depicted embodiment, the upper conveying surface of each lane 20, 22, 24, 26 moves at only one respective speed, it is within the present teaching for the individual speeds of lanes 20, 22, 24, 26 to be varied, setting the specific speed at the time of release based on criteria such as the length of cases 100 in the released batch or other physical characteristics of such cases 100, thus permitting dynamic control of each lane speed to maximize throughput while maintaining control of the merging and singulating of cases 100. In the embodiment depicted all rollers within a lane are driven at the same speed, although the present innovation may be practiced with lanes comprising a plurality of speeds.

Each lane 20, 22, 24, 26 may, as depicted, comprise a plurality of zones in which rollers 16a, 16b, 16c, 16d of the respective lanes 20, 22, 24, 26 may have different orientations than other rollers 16a, 16b, 16c, 16d of the lane. It is noted that each orientation of rollers exerts to some extent a different drive force on a case 100 that a different roller orientation.

The different roller orientations depicted in the figures for lanes 20, 22, 24, 26 are described in detail below. Rollers 16a, 16b, 16c, 16d are disposed with their respective rotational axes at a specific angle relative to the longitudinal direction. With outer frame rails 27, 28 being straight they, along with the parallel inner rails 58, 60, 62, generally establish the longitudinal direction of merging conveyor 2. When a conveyor surface, such as respectively defined by rollers 16a, 16b, 16c, 16d, is configured to a impart a force having a lateral (perpendicular to the longitudinal, downstream direction) to conveyed cases, the force causes lateral movement in the articles. In the embodiment depicted, rollers 16a, 16b, 16c and 16d are skewed, meaning their rotational axes are not disposed perpendicular to the longitudinal direction. For rollers, the skew angle, a measure of the amount of skew, is the angle between the tangential direction of the roller (perpendicular to the roller's rotational axis) and the longitudinal direction, or frame rails 27, 28 or inner rails 58, 60, 62. Geometrically, it is the same as the angle between the roller's rotational axis and a line perpendicular to the longitudinal direction. If the conveying surfaces imparts force/movement to the left (when viewed looking downstream), it is referred to as a left skew. Similarly, if the conveying surfaces imparts force/movement to the right (when viewed looking downstream), it is referred to as a right skew. The direction of the force exerted on a case by a roller is perpendicular to the roller's rotational axis.

Figure 2:
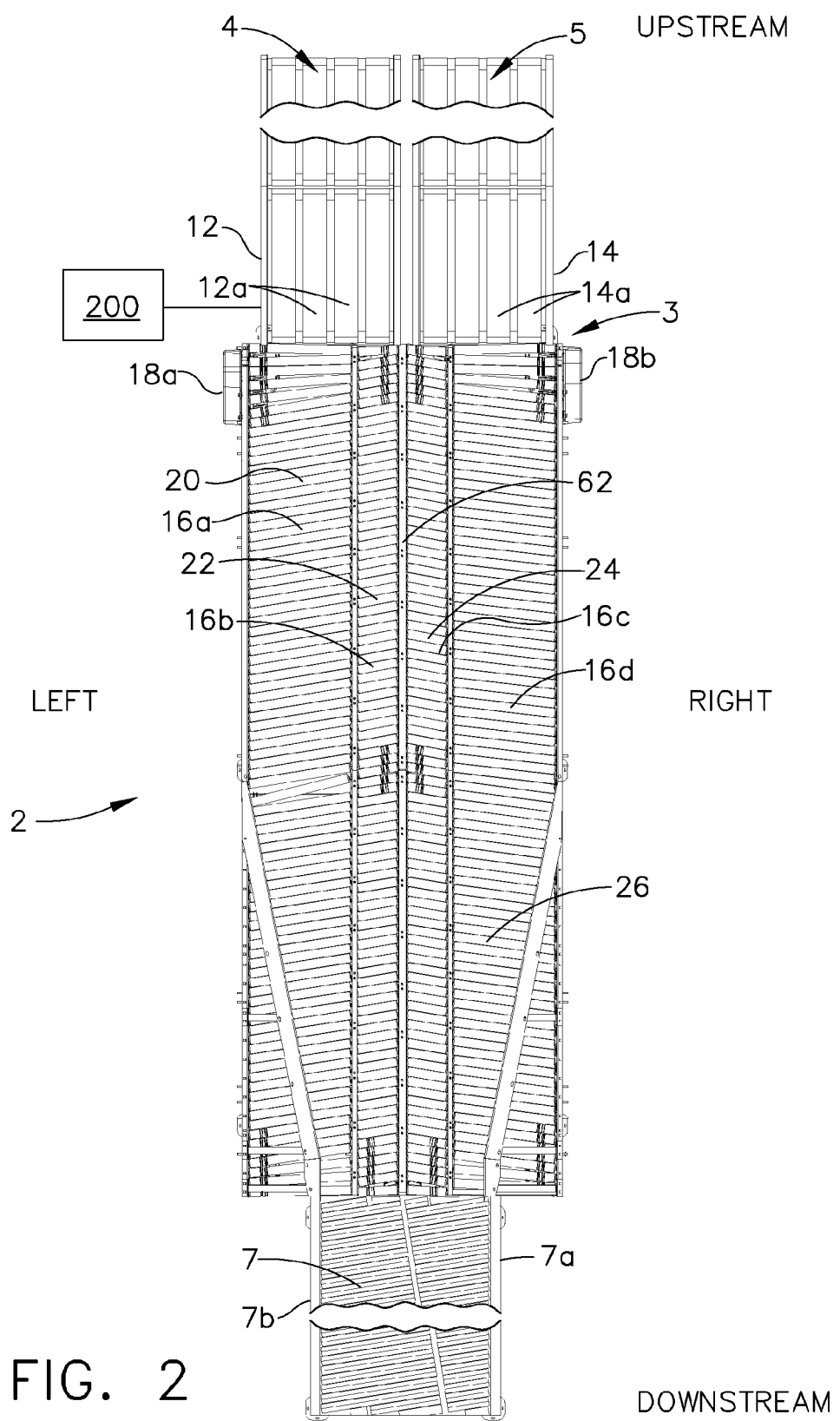
FIG. 2 is a top plan view of the merging conveyor of FIG. 1.
Figure 3:
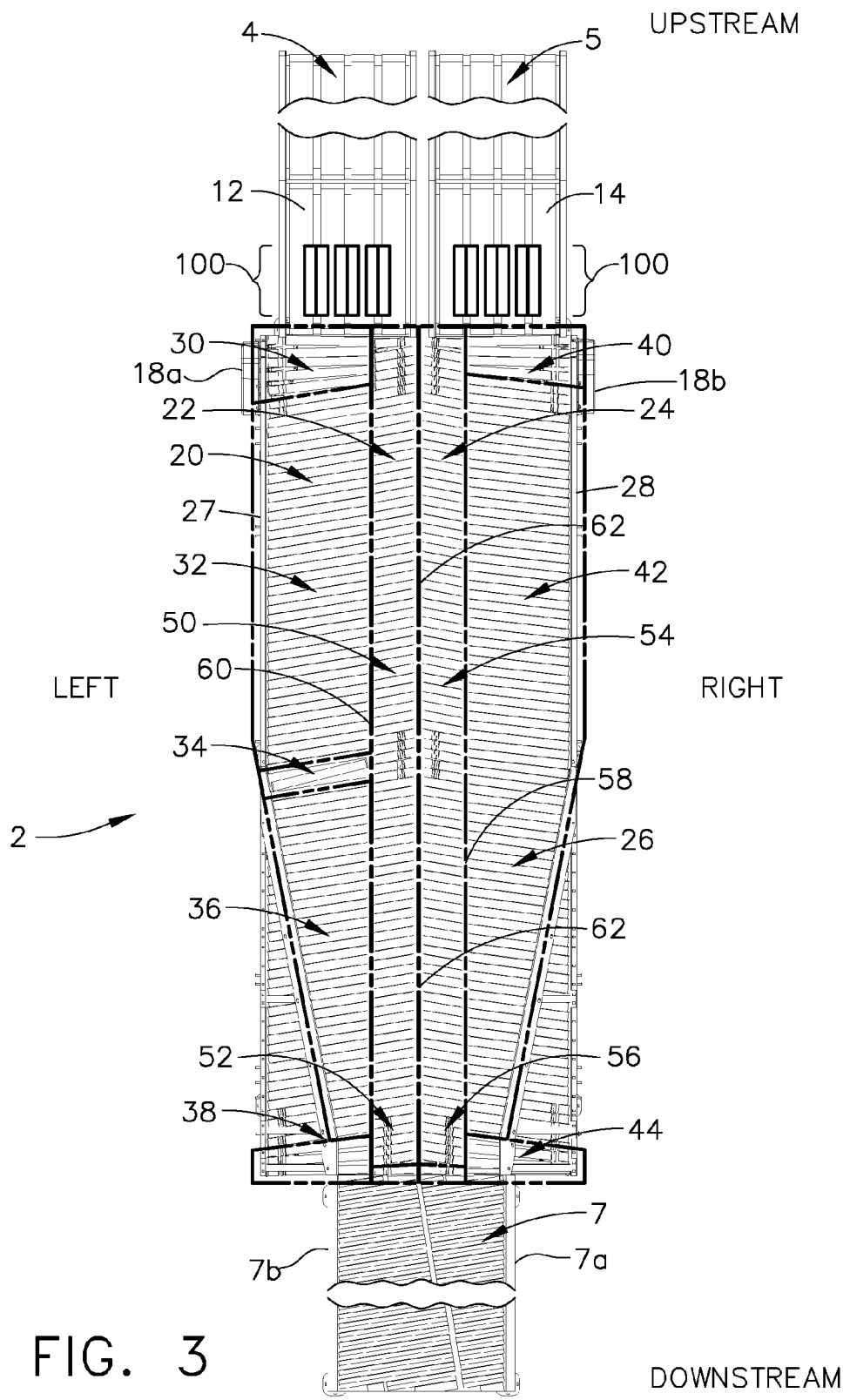
FIGS. 3 and 4 are top plan views of the merging conveyor of FIG. 2 with batches of articles staged for release.
Figure 4:
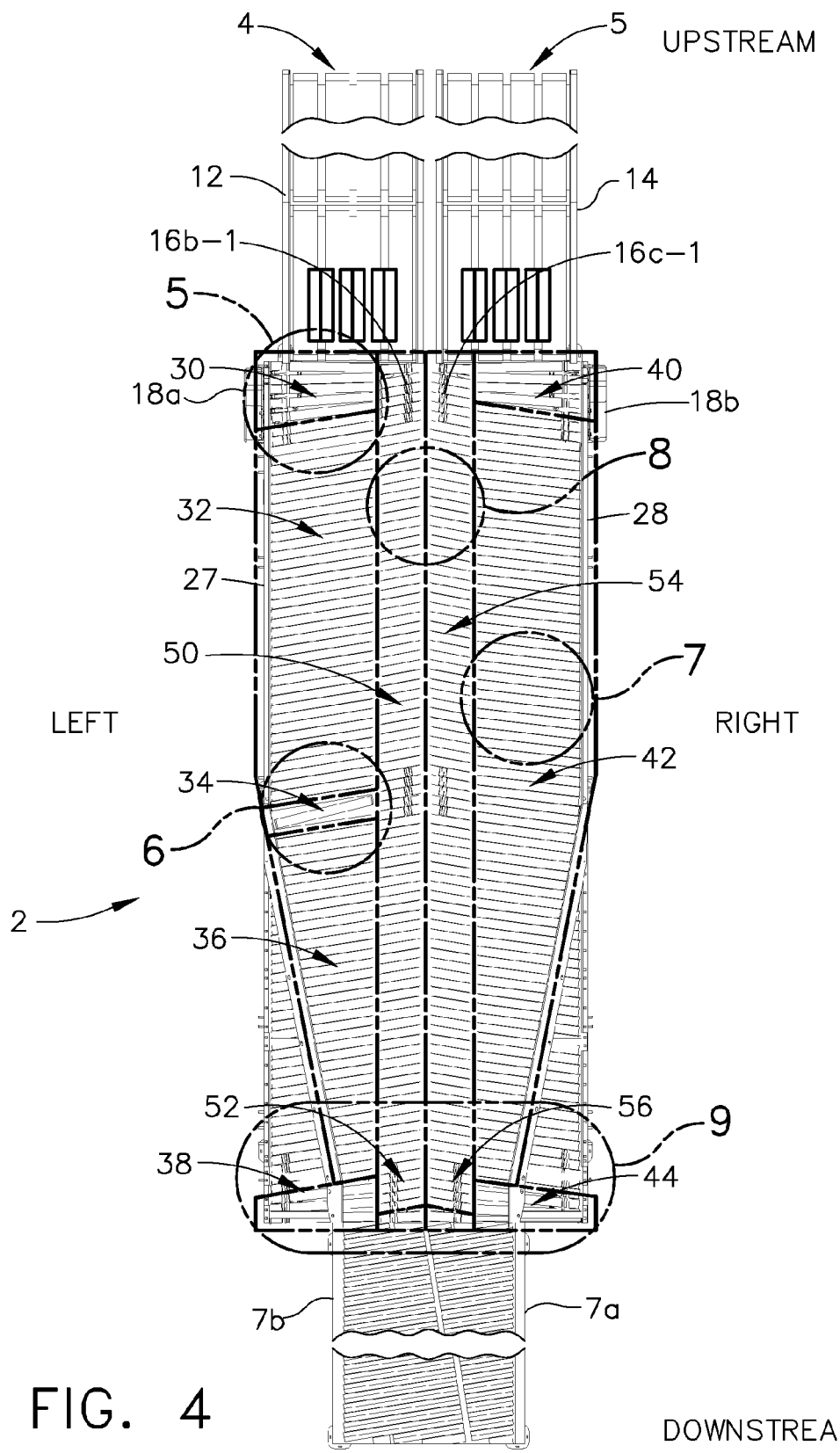

Each lane 20, 22, 24, 26 may be configured with any suitable angle and direction of skew. The specific skew angles of rollers 16a, 16b, 16c, 16d in the embodiment depicted were carefully calculated and tested to work with the different roller speeds of lanes 20, 22, 24, 26 to merge and singulate a batch of three side-by side cases 100 regardless of whether the batch is fed from the first or second staging conveyor 12, 14 respectively. In FIGS. 2, 3 and 4, it can be seen that that the skew angles of rollers 16a, 16b, 16c, 16d are generally skewed or angled to drive a case downstream in the longitudinal direction and laterally inward, regardless of whether the case was released from the left or the right staging conveyor 12, 14.

Figure 5:
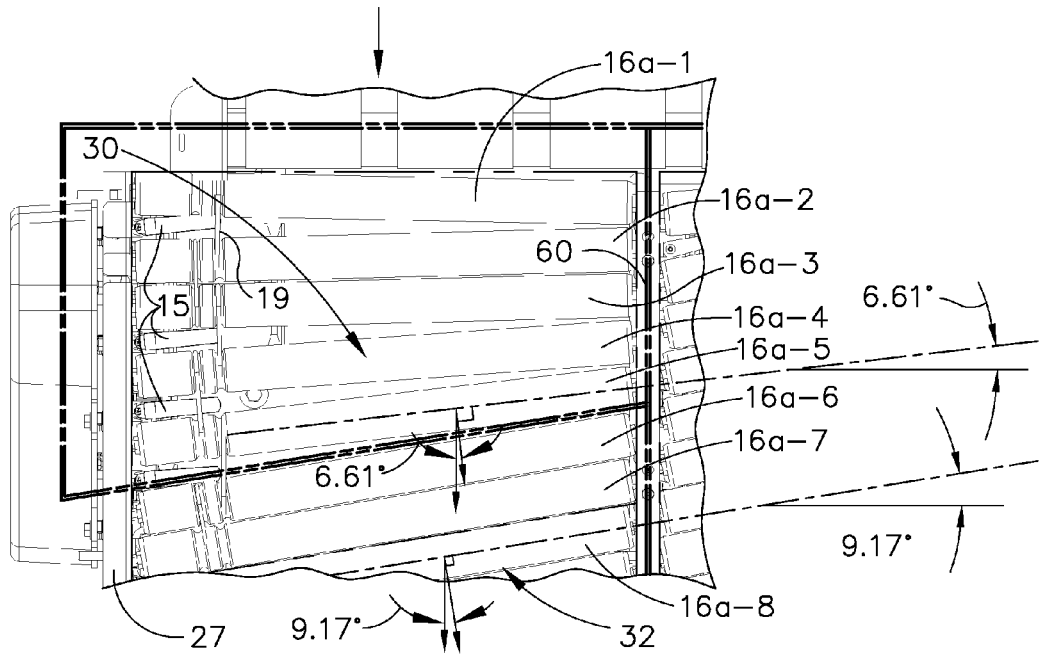
FIG. 5 is an enlarged fragmentary top plan view of area 5 of FIG. 4.
Figure 6:
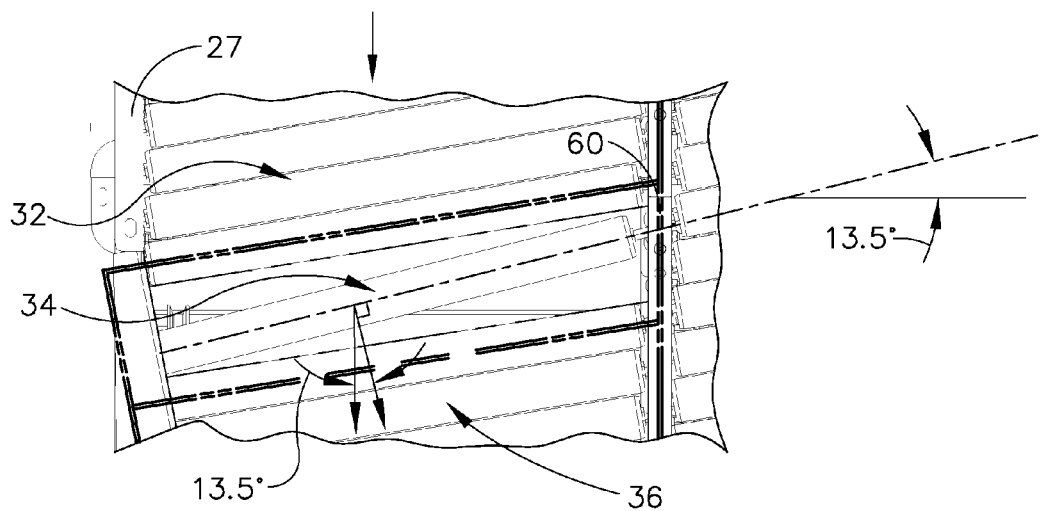
FIG. 6 is an enlarged fragmentary top plan view area 6 of FIG. 4.

FIGS. 5-9 show detailed views of zones of specific roller arrangements identified and numbered in FIGS. 3 and 4. As illustrated in FIG. 5, zone 30 comprises the entrance of lane 20 in which rollers 16a transition from perpendicular (0° skew) of roller 16a-1 to a skew angle of 6.61° left of roller 16a-5, leading to the 9.17° left skew of rollers 16a-6, 16a-7 and 16a-8, the skew angle of rollers 16a of downstream zone 32. The fanning, which may be done in as short a distance as practical accounting for hole locations in the conveyor frames, maintains the gaps between the outer ends of roller 16a-1 through 16a-7, adjacent frame rail 27, at acceptably small sizes. Fingers 15 may extend from frame rail 27 into these gaps to block the gaps. As is known, rollers in some locations of merging conveyor 2, such as near either end, may not be able to engage the underlying drive belt. Individual drive elements, such as O-band drives 19, may be disposed in grooves in adjacent rollers, such as us illustrated between rollers 16a-1 and 16a-2. Any suitable transition configuration may be used at the entrance or exit of a lane.

In the embodiment depicted, it is noted that as a result of the increasing skew angles, rollers 16a-1 through 16a-8 exert an increasing amount of inward bias on the cases 100. Cases 100 are driven by the rollers in a generally downstream direction perpendicular to the axis of rotation of the rollers. The increasing inward bias turns the advancing cases 100 to align with the skew angle of zone 32 located directly downstream of zone 30 as shown in FIG. 5. Rollers 16a-1 through 16a-5 extend between frame rail 27 and left inner rail 52. As indicated, last roller 16a-5 of zone 30 has a skew angle of about 6.61° left.

Zone 32 of lane 20 comprises a plurality of rollers 16*a* supported by frame rail 27 and left inner rail 60, oriented at an skew angle of 9.17° left. As best shown in FIG. 5, zone 32 begins directly below the zone 30, and will drive cases 100 at the speed of lane 20 and at an angle of 9.17° to frame rail 27, toward lane 22.

Zone 34 of lane 20 is disposed directly downstream of zone 32 and comprises a single roller 16*a*-9 extending between frame rail 27 and left inner side rail 60. Roller 16*a*-9 is disposed at a skew angle of 13.5° left. Zone 34 is positioned a little farther than half way down the merging conveyor 2 and is configured to induce a short but sharp inward bias to cases 100 traveling thereon. Roller 16*a*-9 may be driven by any suitable drive arrangement, such as an the underlying belt which drives the other rollers of lane 20, or may comprise an MDR. Zone 34 may comprise a plurality of similar rollers 16*a*-9, and may be driven at a faster or slower speed than the rest of lane 20.

Zone 36 of lane 20 is disposed directly downstream of zone 34 and comprises a plurality of rollers 16*a* supported by frame rail 27 and left inner rail 60, oriented at a different skew angle than zone 34, matching, in the embodiment depicted, the skew angle of rollers 16*a* of zone 32, 9.17° left. Zone 36 reduces the amount of inward bias from that of zone 34.

Figure 9:
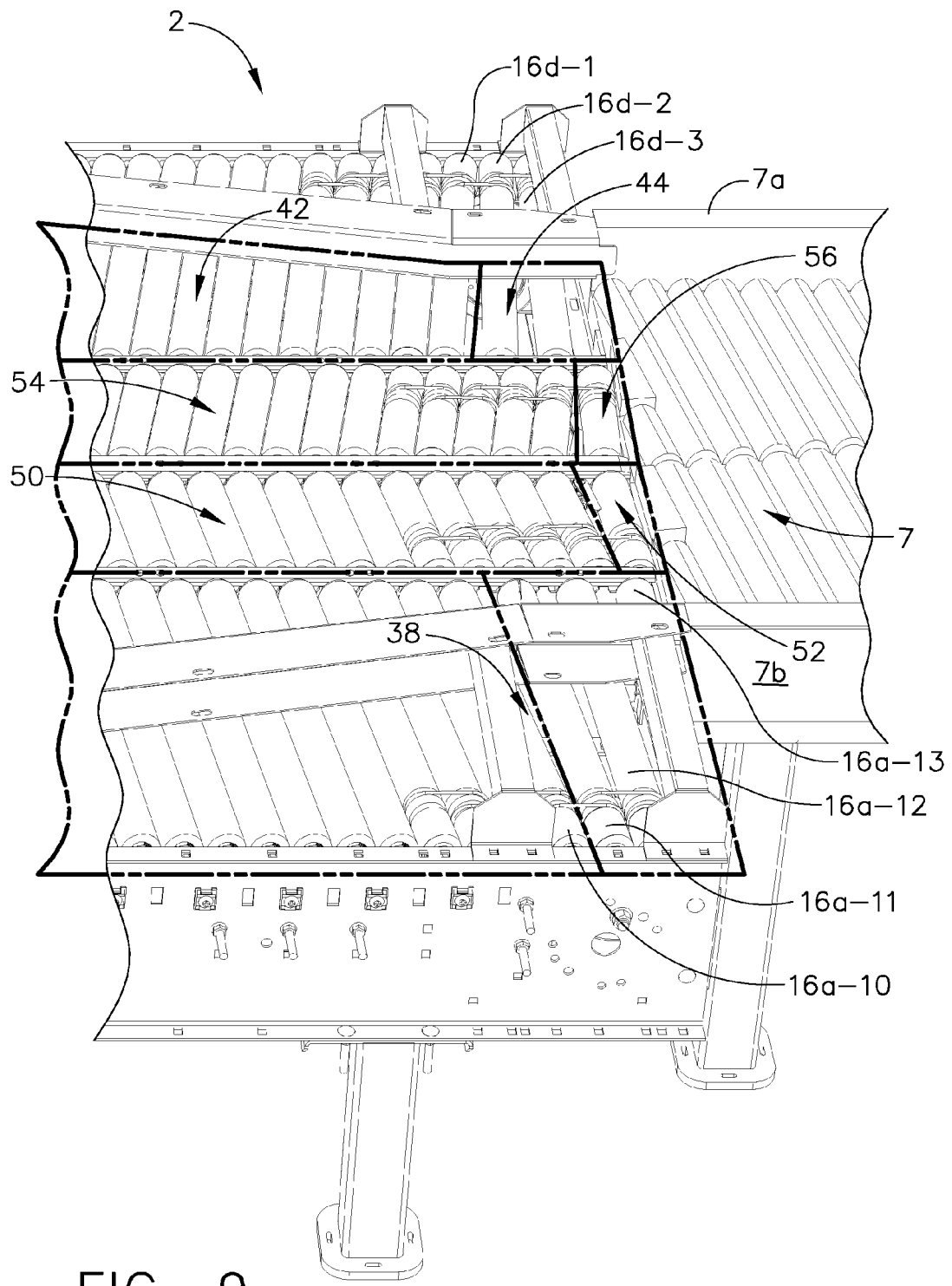
FIG. 9 is an enlarged fragmentary perspective view of area 9 of FIG. 4.
Figure 10:
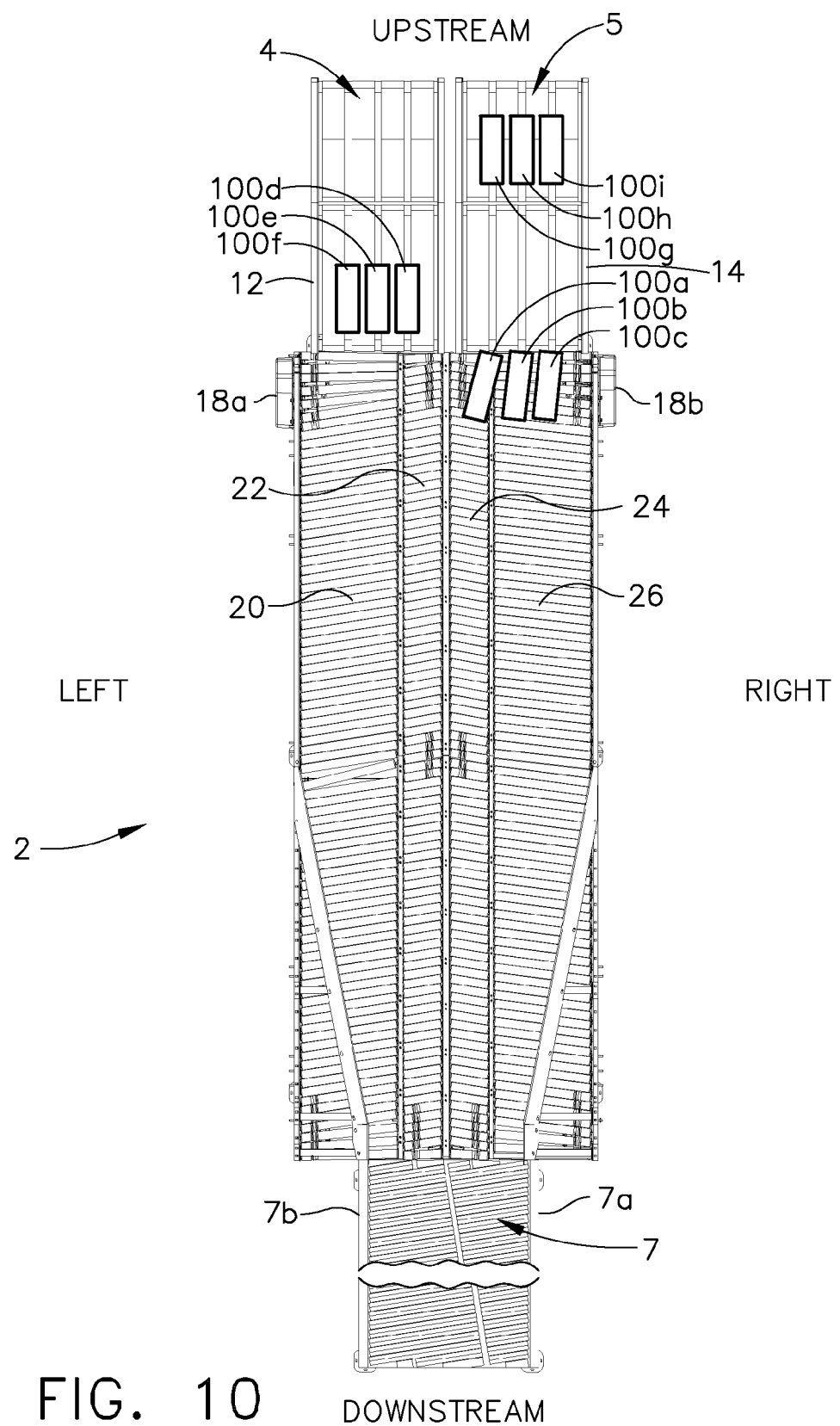
FIGS. 10-19 illustrate top views of the progression of separation and merge progression of a plurality of cases released at different times onto the merging conveyor of FIG. 2.

Zone 38 of lane 20 is disposed directly downstream of zone 36 and discharges cases 100 onto unscrambler 7. Zone 38 is best shown in FIG. 9 and comprises the final three rollers 16*a*-11, 16*a*-12, 16*a*-13 of lane 20, supported by frame rail 27 and left inner rail 60. Rollers 16*a*-11, 16*a*-12 and 16*a*-13 transition back from the left skew angle of last roller 16*a*-10 of zone 36 to 0° skew angle. The fanning back to zero skew introduces acceptably sized gaps between the inner ends of rollers 16*a*-11, 16*a*-12, 16*a*-13 adjacent left inner rail 60

As seen in FIGS. 3 and 4, zone 40 of lane 26 lies between frame rail 28 and right inner rail 58 directly downstream of staging conveyor 14. The configuration of Zone 40 is similar to that of zone 30, transitioning its rollers 16*d* from 0° skew to, in the embodiment depicted, a right skew angle of 6.64°, smaller than the skew angle of zones 32 and 36 of lane 20.

Figure 7:
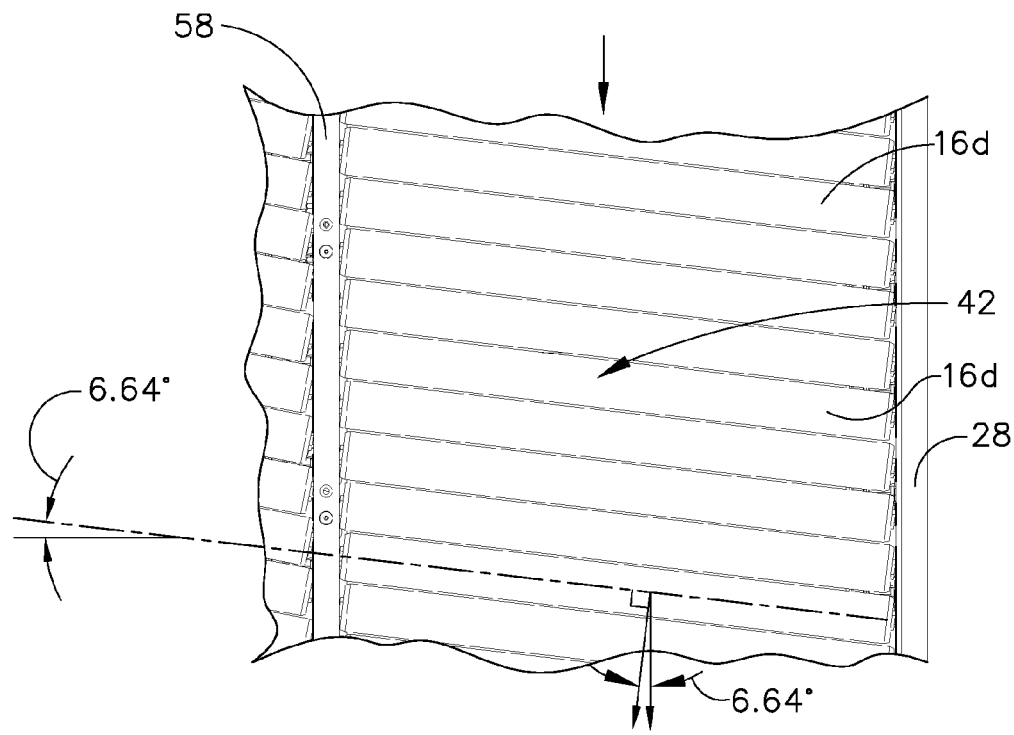
FIG. 7 is an enlarged fragmentary top plan view of area 7 of FIG. 4.

As seen in FIG. 7, zone 42 of lane 26 lies directly downstream from zone 40 and comprises a plurality of rollers 16*d* that are disposed at a skew angle of 6.64° right, from the downstream end of the transition of zone 40 to the downstream end of the transition of zone 44, described below.

As seen in FIG. 9, zone 44 of lane 26 is disposed directly downstream of zone 42 and discharges onto unscrambler 7. Zone 44 comprises the final two rollers 16*d*-2, 16*d*-3 of lane 26, supported by frame rail 28 and right inner rail 58. Rollers 16*d*-2 and 16*d*-3 transition back from the right skew angle of last roller 16-*d*1 of zone 42 to a non-zero skew angle. The fanning introduces acceptably sized gaps between the inner ends of rollers 16*d*-1, 16*d*-2, 16*d*-3 adjacent right inner rail 58. angle 0° skew.

Figure 8:
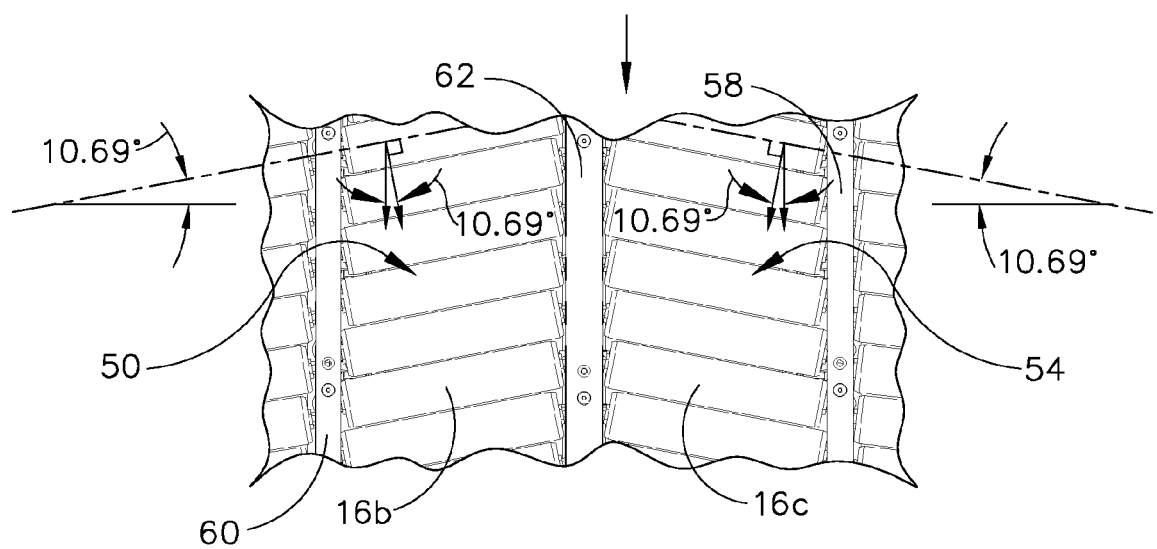
FIG. 8 is an enlarged fragmentary top plan view of area 8 of FIG. 4.

Referring to FIG. 8, zone 50 of lane 22 comprises a plurality of rollers 16*b*, supported by left inner rail 60 and central rail 62, disposed at a skew angle of 10.69° left, an angle greater than the skew angle of zones 32 and 36 of lane 20. As seen in FIG. 4, a single roller 16*b*-1 provides the transition at the entrance end of lane 22 upstream of zone 50, disposed at a skew angle greater than zero and less than the skew angle of zone 50. As seen in FIG. 9, a single roller 16*b*-2 provides the transition at the exit end of lane 22 downstream of zone 50, disposed at a skew angle greater than zero and less than the skew angle of zone 50.

Similarly, FIG. 8 illustrates zone 54 of lane 24 which comprise a plurality of rollers 16*b*, supported by right inner rail 58 and central rail 62, disposed at a skew angle of 10.69° right, an angle greater than the skew angle of zone 42 of lane 26. As seen in FIG. 4, a single roller 16*c*-1 provides the transition at the entrance end of lane 24 upstream of zone 54, disposed at a skew angle greater than zero and less than the skew angle of zone 42. As seen in FIG. 9, a single roller 16*c*-2 provides the transition at the exit end of lane 24 downstream of zone 54, disposed at a skew angle greater than zero and less than the skew angle of zone 54.

Unscrambler 7 receives cases 100 discharged by merging conveyor 2. Unscrambler 7 may have any suitable configuration. In the embodiment depicted, unscrambler 7 comprises three consecutive sections 8*a*, 8*b*, 8*c* with generally identical arrangements of skewed rollers which define an upper conveying surface configured to advance cases 100 downstream and towards left frame rail 7*a* of unscrambler 7. Each section 8*a*, 8*b*, 8*c* has a respective left section 8*a*-L, 8*b*-L, 8*c*-L, and a respective right section, 8*a*-R, 8*b*-R, 8*c*-R separated by angled rails 8*a*-C, 8*b*-C, 8*c*-C. Referring only to section 8*a*, it being understood that the description is applicable to sections 8*b* and 8*c*, section 8*a*-L comprises rollers supported between left frame rail 7*a* and angled rail 8*a*-C which get progressively shorter in the downstream direction and section 8*a*-R comprises rollers supported between right frame rail 7*b* and angled rail 8*a*-C which get progressively longer in the downstream direction. Except for the transitional configuration of rollers at the entrance of section 8*a* (and at the exit of section 8*c*), rollers of sections 8*a*-L and of 8*a*-R are arranged in pairs having aligned axes of rotation, with the roller lengths complementarily decreasing and increasing to match the constant width of unscrambler 7.

The rollers of sections 8*a*-R and 8*a*-L may be driven by any suitable arrangement, such as by an underlying belt which drivingly engages the rollers. Sections 8*a*-R and 8*a*-L be driven independent of each other, and in the embodiment depicted, section 8*a*-R is driven at a higher speed than section 8*a*-L.

Sections 8*a*, 8*b*, and 8*c* function together to complete singulation of any non-singulated cases 100 which may be discharged by merging conveyor 2, and to edge align them along left frame rail 7*a*. For example, cases which are controlled by section 8*a*-R will advance faster than cases controlled by section 8*a*-L. Cases which span the two sections 8*a*-R and 8*a*-L, such as long cases, may rotate counter clockwise (viewed from the top) as a result of the rollers of section 8*a*-R overrunning the rollers of section 8*a*-L, while the skew angle of both sections 8*a*-R, 8*a*-L moves the cases toward left frame rail 7*a*.

Singulation may be further effected by section 8*a*-R being driven at the same speed as section 8*b*-L, with section 8*b*-R being driven faster than section 8*b*-L. The alignment of section 8*a*-R with 8*b*-L allows a single underlying belt to commonly drive both sections. Similarly, section 8*b*-R may be driven at the same speed as section 8*c*-L, also by a single common underlying belt driving both sections, with section 8*c*-R being driven faster than section 8*c*-L.

Unscrambler 7 includes right side wall 9, first vertical belt 10, which extends inwardly a first overhang amount further than right side wall 9, and second vertical belt 11, which extends inwardly a second overhang amount further than side wall 9. The first overhang amount is greater than the second overhang amount. As shown by arrows, vertical belts 10 and 11 are configured to move cases downstream.

The effects of the roller speed, organizing the rollers 16 into lanes, and the angular orientation and spacing of the rotational axis of the rollers 16 all contribute to separation and merging the cartons into a line as illustrated in FIGS. 10-19, which are an illustrational sequence of feeding three batches of three side-by cases 100 through merging conveyor 2. The batches are released first from staging conveyor 14, then from staging conveyor 12, and then from staging conveyor 14. Cases 100 are numbered as 100*a* through 100*i* so that each case can be tracked as the cases are singulated and exit from unscramble 7. The configuration of the four laterally spaced apart lanes 20, 22, 24, 26 comprising upper conveying surfaces which imparts lateral force to and the resultant lateral movement of cases 100, results in the singulation and merging of cases 100 according to their batch grouping into a single file line of cases 100 advancing in the downstream direction. Operation of the lanes at a plurality of speeds contributes to the singulation of cases 100.

Figure 11:
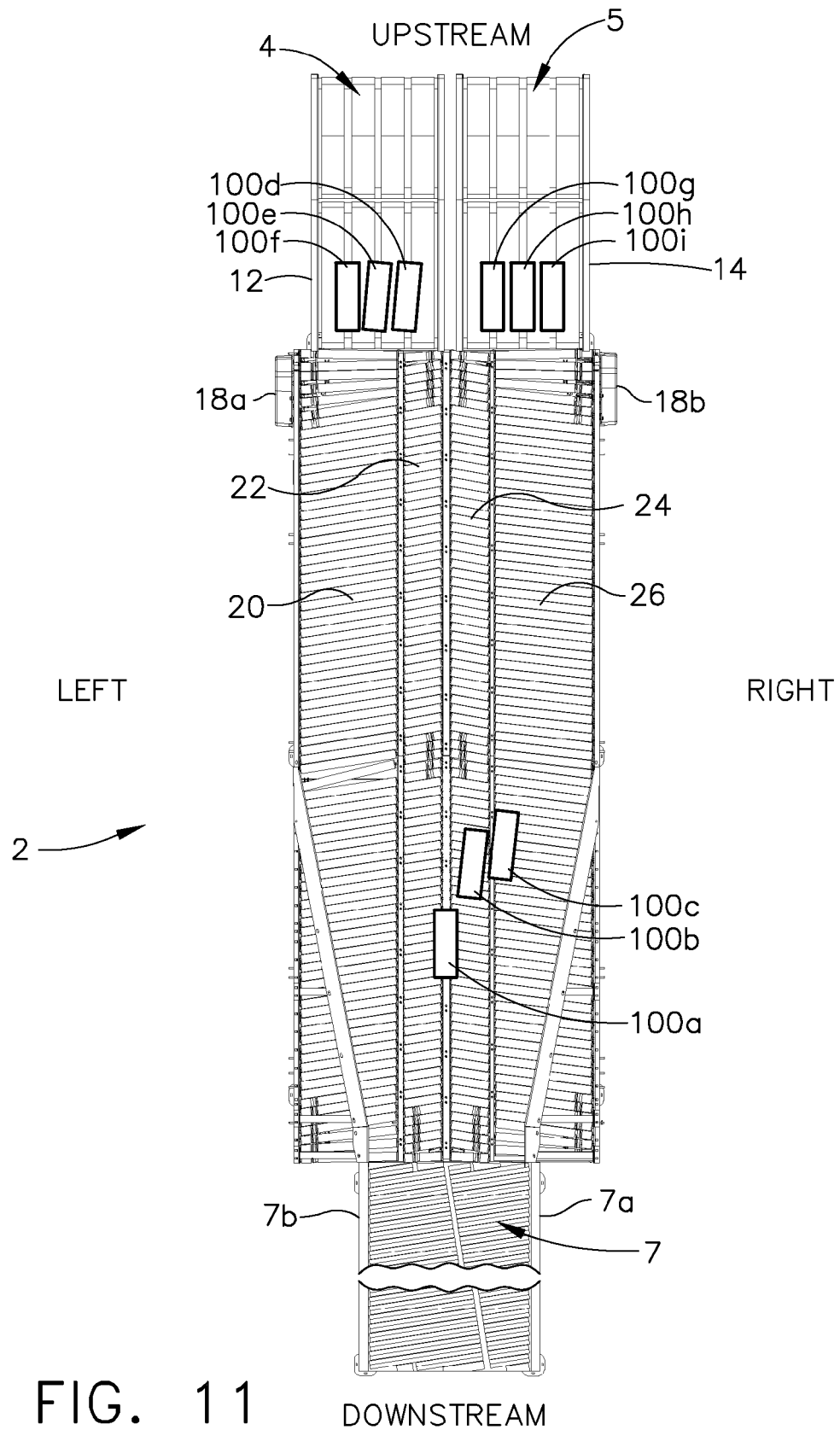

As shown in FIG. 11, after release by staging conveyor 14 (FIG. 10), the skew angles and different speeds of lanes 22, 24, 26 has advanced case 100*a* to straddle lanes 22 and 24, with the skew angle of lane 22 urging case 100*a* toward lane 24, and vice versa, reaching an equilibrium path along the two lanes 22, 24, which, as a result of their configuration, jointly tend to maintain any cases that reach them in an equilibrium shared path.

Figure 12:
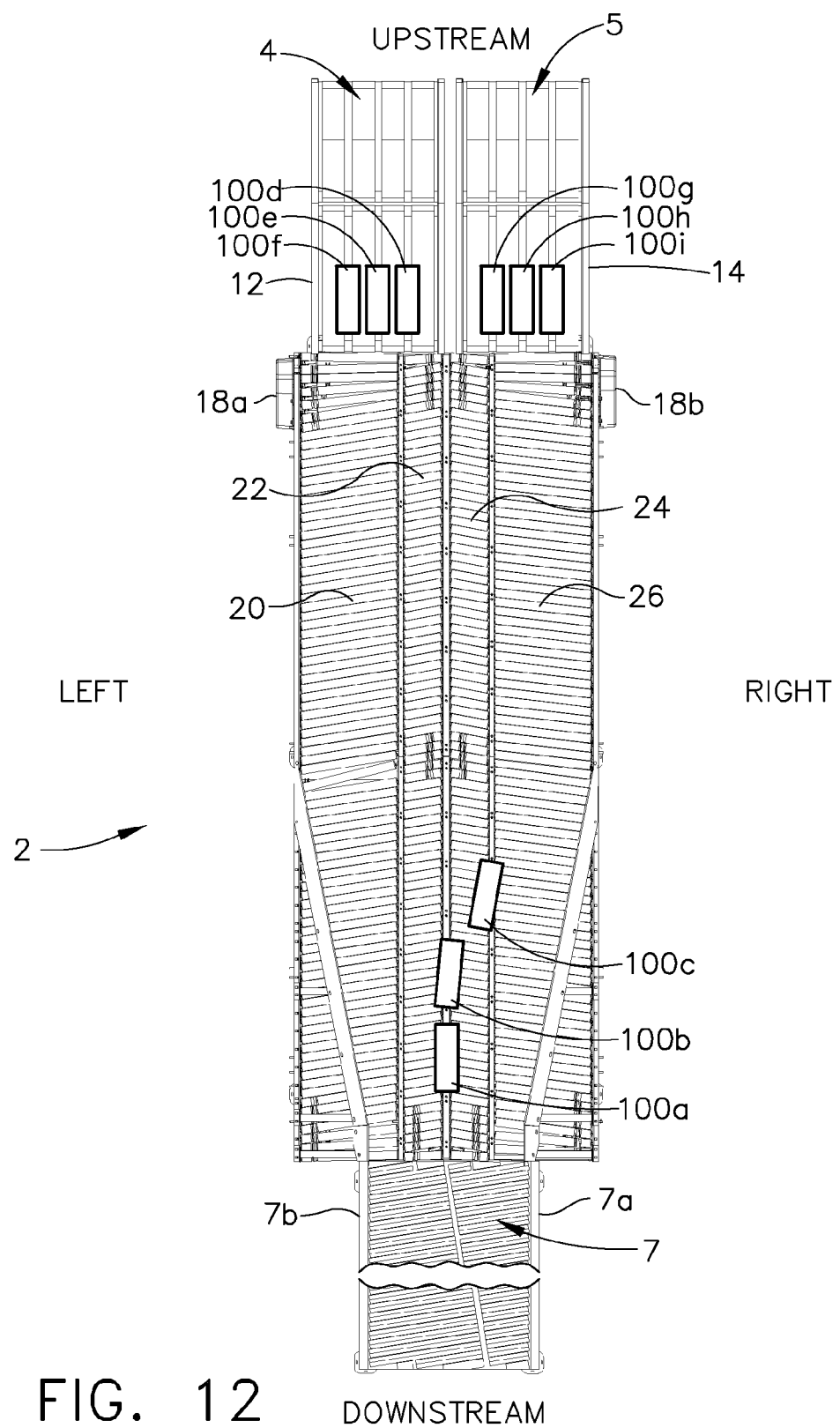
Figure 13:
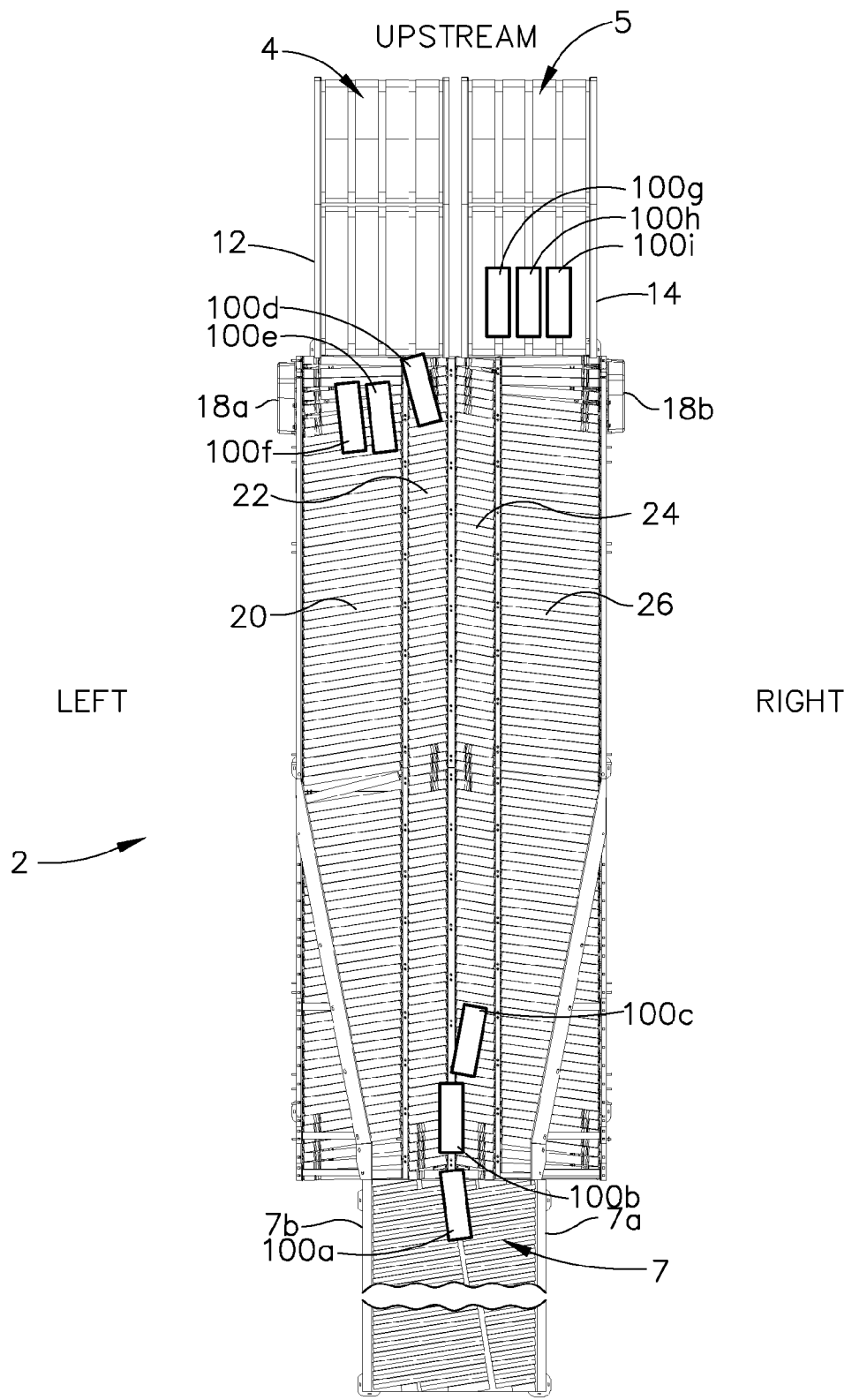
Figure 14:
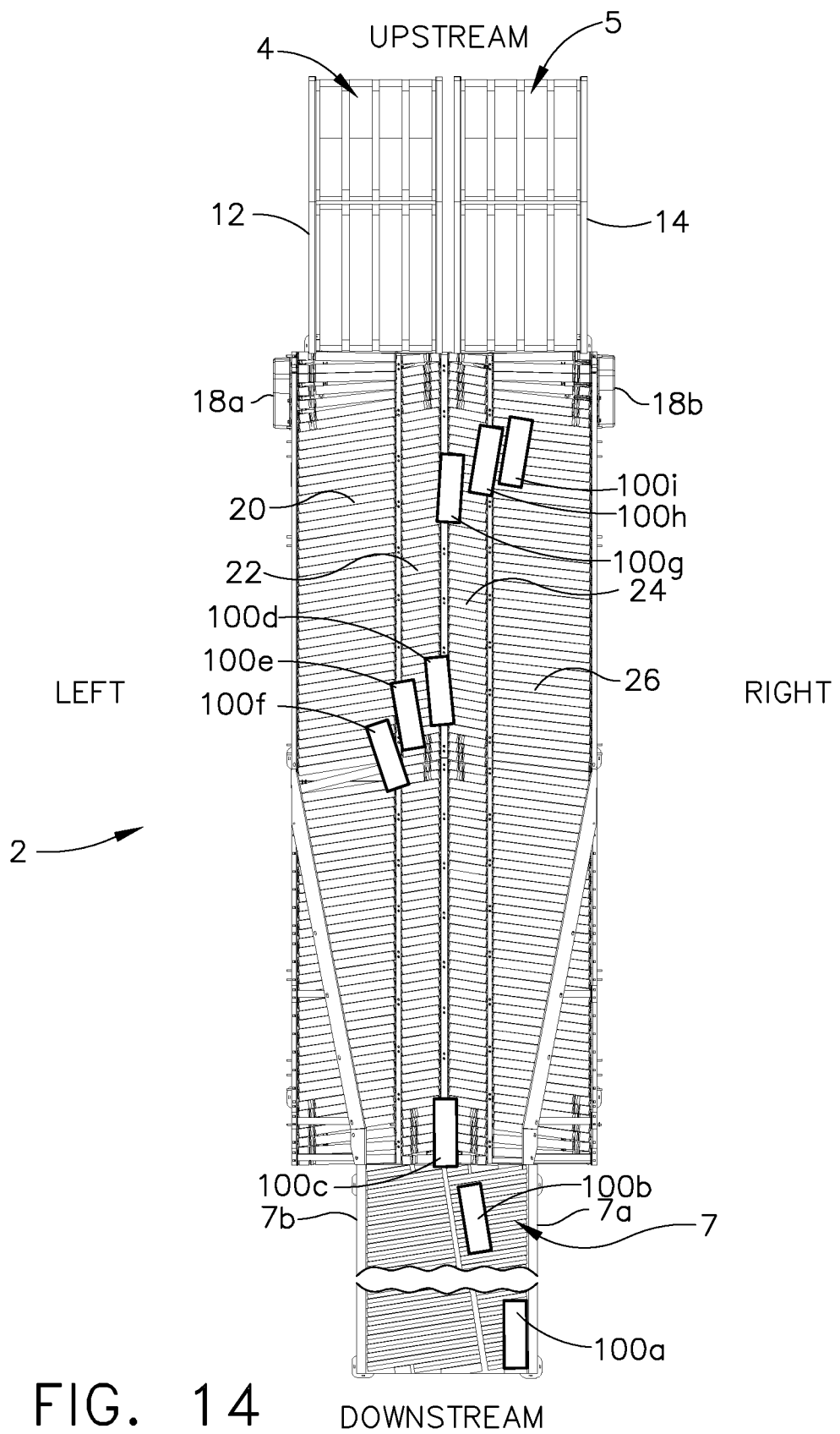

The different speeds have advanced case 100*a* ahead of case 100*b* and 100*c* as shown. With case 100*b* entirely on lane 24, it advances faster than case 100*c* and more inwardly, and, as shown in FIG. 12, becomes completely clear of case 100*c*, all three cases 100*a*, 100*b*, 100*c* being singulated. FIG. 13 illustrates the release of cases 100*d*, 100*e*, 100*f* as case 100*a* is almost completely discharged from merging conveyor 2 onto unscramble 7. Case 100*d* is illustrated entirely on lane 22, and cases 100*e* and 100*f* are advanced faster by lane 20, as seen in FIG. 14. FIG. 14 illustrates cases 100*g*, 100*h*, 100*i* released by staging conveyor 14 although cases 100*d*, 100*e*, 100*f* have traveled less than about half the length of merging conveyor 22. In contrast to the release of cases 100*d*, 100*e*, 100*f* when cases 100*a*, 100*b*, 100*c* are close to the discharge end of merging conveyor 2, as seen in FIG. 13, cases 100*g*, 100*h*, 100*i* can be release earlier relative to cases 100*d*, 100*e*, 100*f* as a result of lanes 24 and 26 moving slower than lanes 20 and 22.

Figure 15:
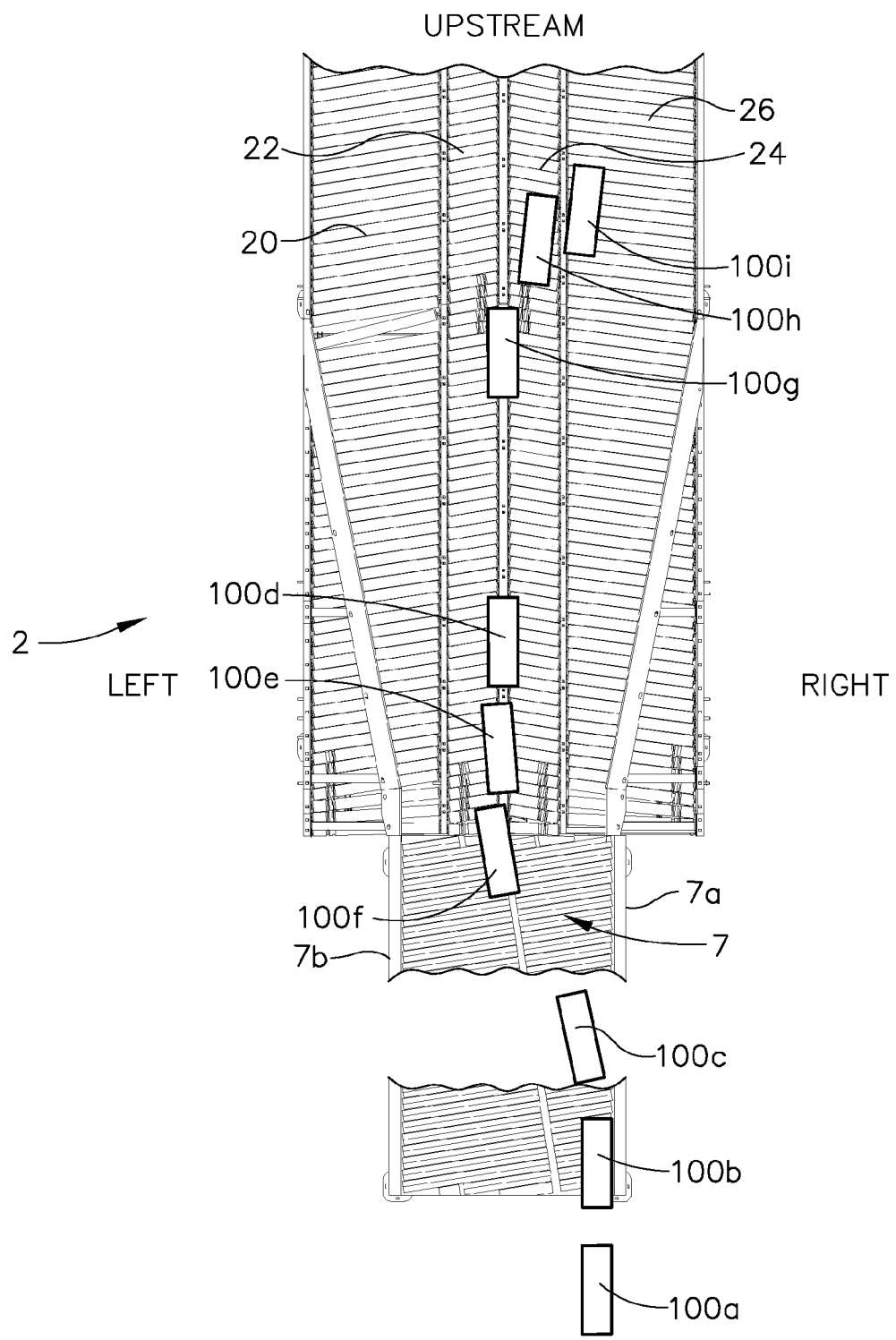
Figure 16:
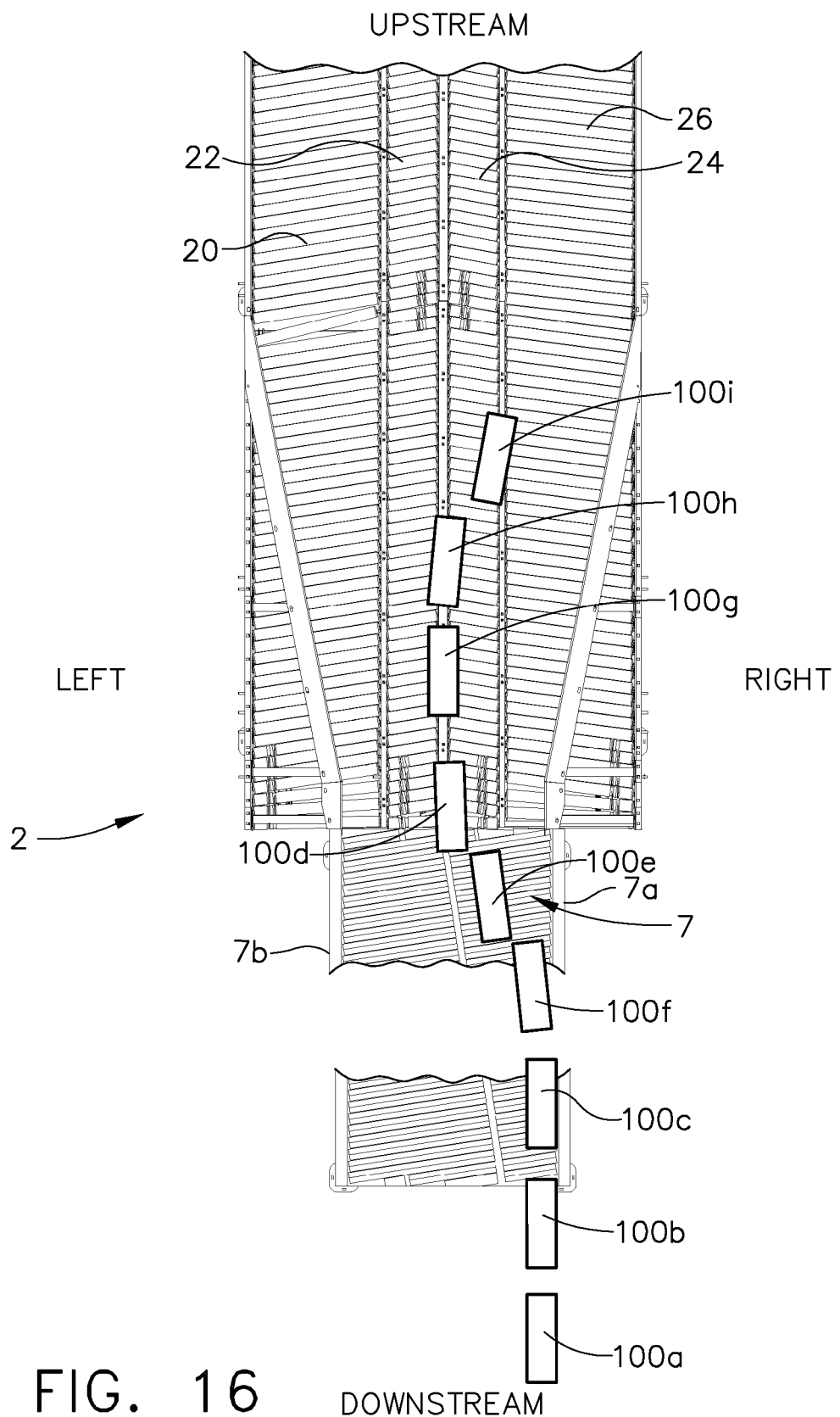
Figure 17:
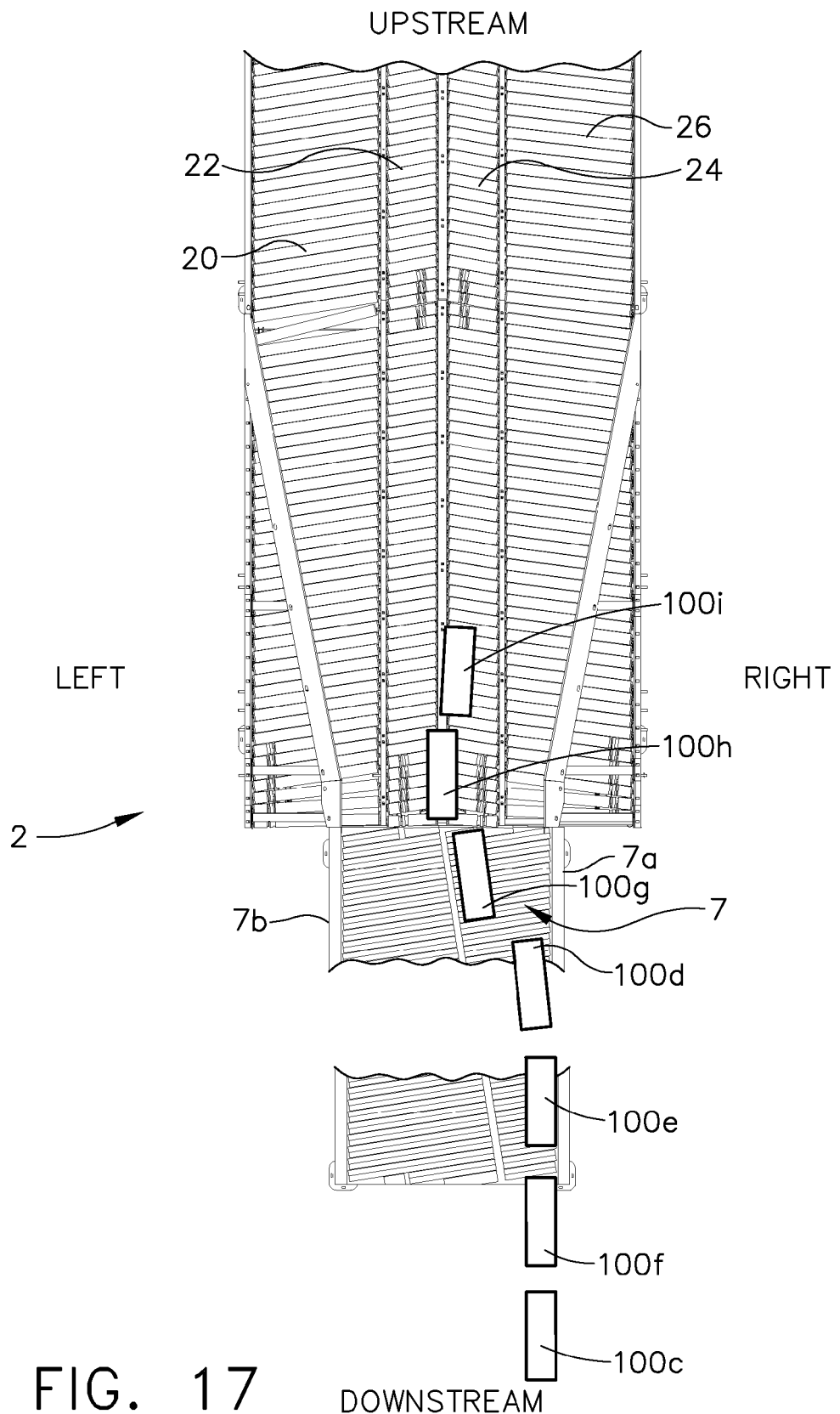
Figure 18:
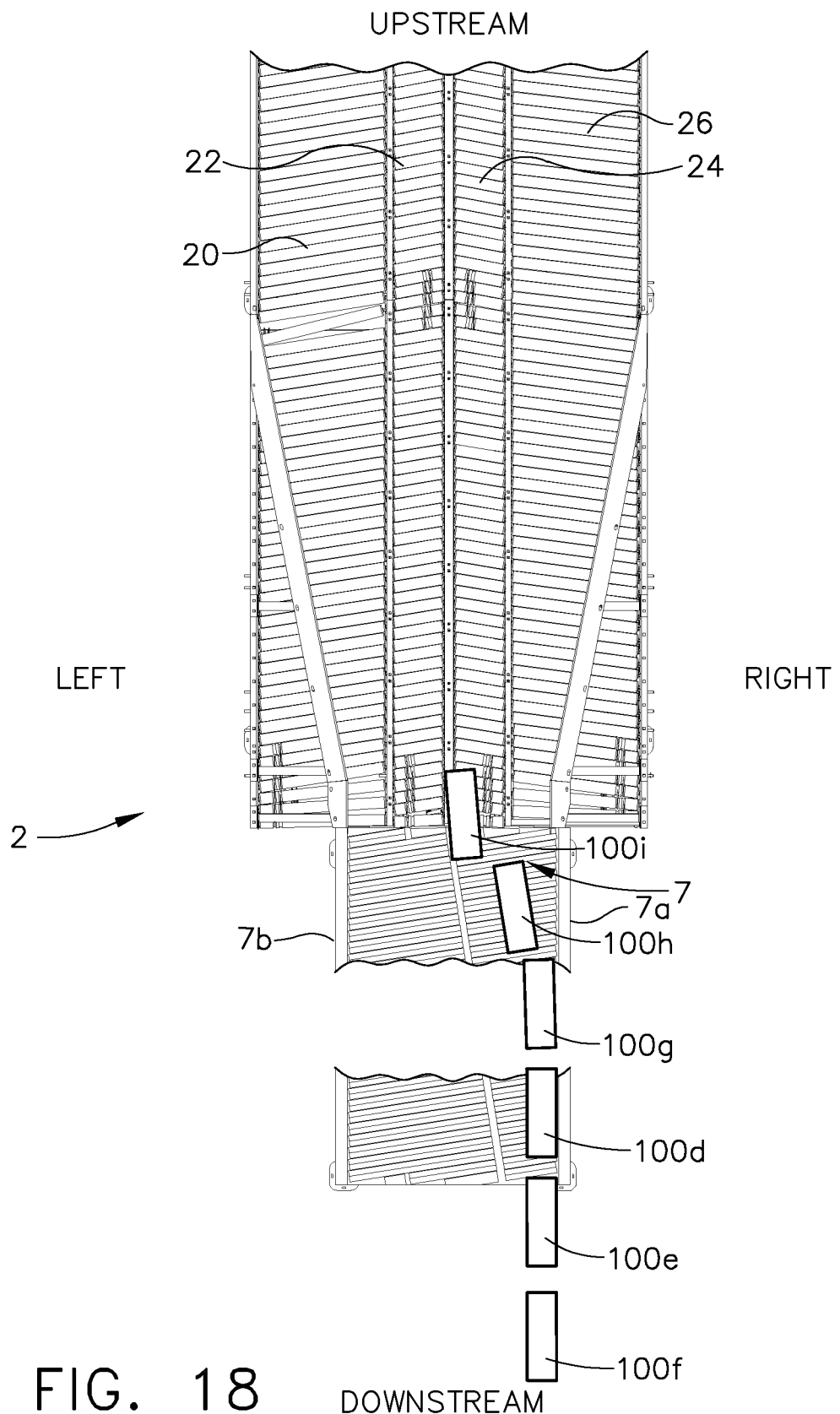
Figure 19:
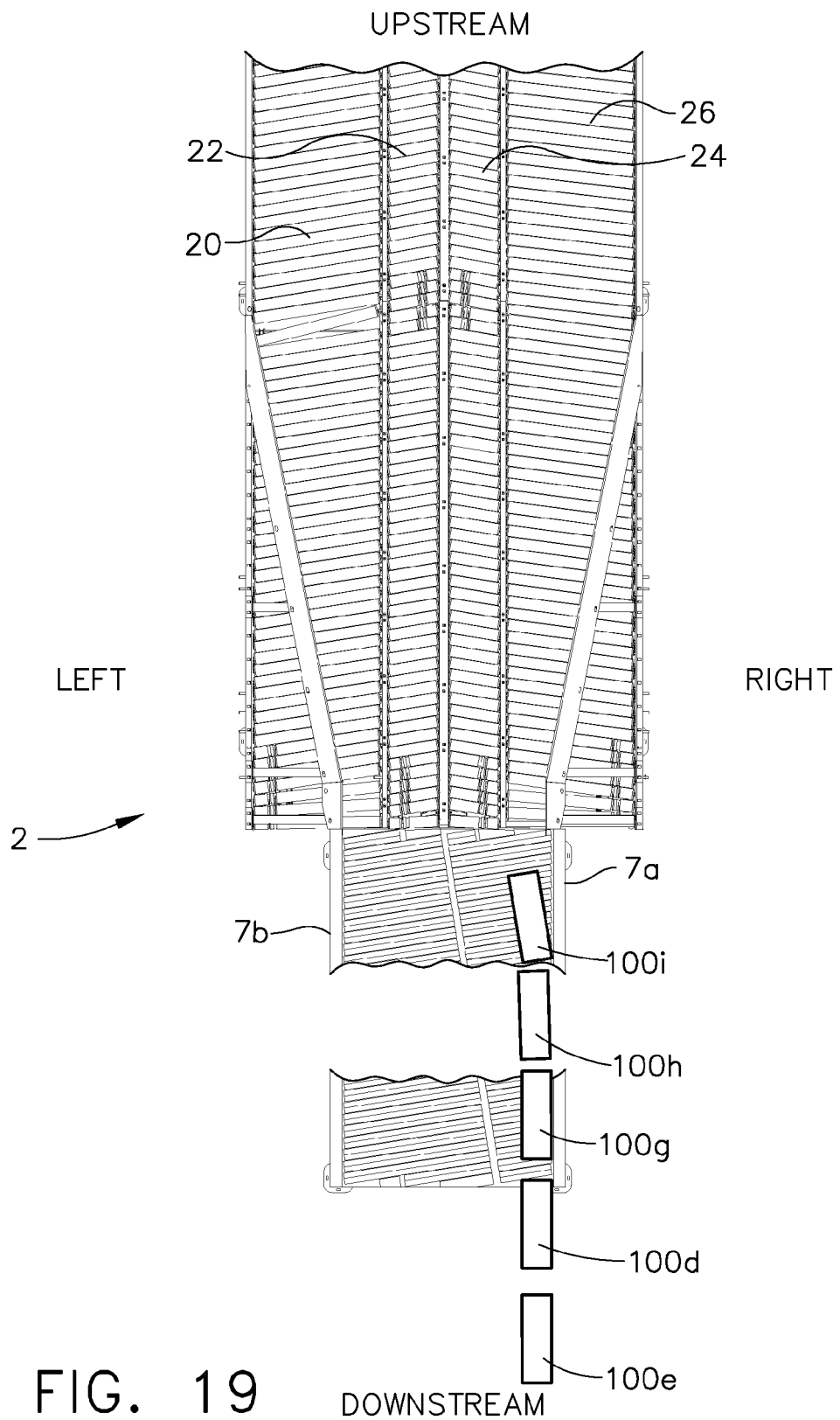

From their positions in FIG. 14, case 100*e* advances faster than case 100*d* by virtue of case 100*e* being essentially completely on lane 22 whereas case 100*d* is nearly on a slower equilibrium path along lanes 22, 24, and case 100*f* advances faster than case 100*e* by virtue of case 100*f* being advanced mostly by faster lane 20. FIG. 15 illustrates the difference in speeds, showing cases 100*d*, 100*e*, 100*f* completely singulated and that batch of cases merged in behind the first released batch of cases 100*a*, 100*b*, 100*c*. Case 100*g* is illustrated as advanced ahead of the other two cases 100*h*, 100*i* of the third batch. FIG. 16 illustrates all cases 100*g*, 100*h*, 100*i* of the third batch singulated and merged in behind the second batch. FIGS. 17, 18 and 19 show the merged batches progressing downstream, and aligned along side 7*a*.

Figure 20:
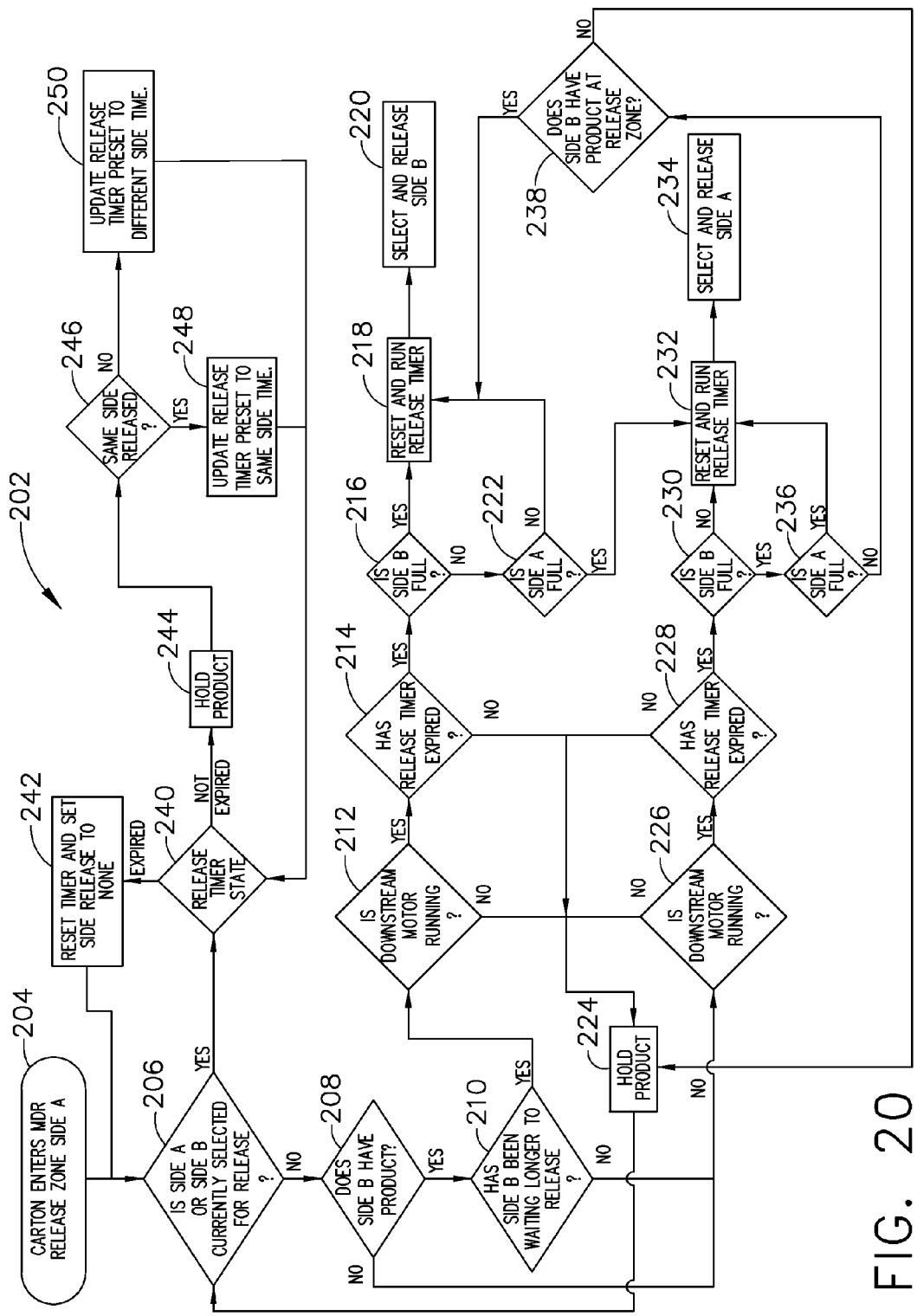
FIG. 20 illustrates the logic of an embodiment of the conveyor for discharging articles to the merging conveyor of FIG. 1.

Referring to FIG. 20, logic for controlling the discharge of cases 100 from staging conveyors 13 and 14 onto merging conveyor 2, generally indicated at 202. Control logic 202 determines which staging conveyor 13, 14 to release and when. Control logic 202 may be executed every scan.

At block 206, it is determined whether staging conveyor 13 ("side A" in the drawing) or staging conveyor 14 ("side B" in the drawing) is currently selected to be released. If not, the logic proceeds to block 208 where the logic determines whether staging conveyor 14 has an article ("product" in the drawing). If staging conveyor 14 has an article, the logic proceeds to block 210, and the logic determines whether staging conveyor 14 has been waiting longer to release than staging conveyor 13. If it has, the logic proceeds to block 212, where it is determined whether merging conveyor 2 is running If merging conveyor is determined to be running, then at block 214, it is determined whether the release timer (discussed below) has expired. If so, the logic determines at block 216 whether staging conveyor 14 is full, in which case at block 218 the release timer is reset and run, and staging conveyor 14 is selected and released at block 220.

Returning to block 216, if staging conveyor 14 is determined not to be full, the logic proceeds to block 222 and determines whether staging conveyor 13 is full. If staging conveyor 13 is not full, the logic proceeds to block 218, discussed above.

If at block 214, the release time has not expired, the logic proceeds to block 224, the article is held, and the control logic returns to block 206.

If at block 212, it is determined that merging conveyor 2 is not running, the logic proceeds to block 224 and then to block 206.

If at block 208 staging conveyor 14 does not have an article, or if at block 210 staging conveyor 14 has not been waiting longer to release than staging conveyor 13, the logic proceeds to block 226 and determines whether merging conveyor 2 is running If merging conveyor 2 is not running, the logic proceeds to block 224, then to block 206. If merging conveyor 2 is running, then it is determined at block 228 whether the release timer has expired. If it has not, the logic proceeds to block 224, then to block 206. If the release timer is determined to be expired at block 228, the logic determines at block 230 whether staging conveyor 14 is not full, in which case at block 232 the release timer is reset and run, and staging conveyor 13 is selected and released at block 234.

If staging conveyor 14 is determined to be full at block 230, the logic proceeds to block 236 and determines whether staging conveyor 13 is full. If staging conveyor 13 is full, the logic proceeds to block 232 the release timer is reset and run, and staging conveyor 13 is selected and released at block 234.

If staging conveyor 13 is determined not to be full at block 236, the logic proceeds to block 238, and it is determined whether staging conveyor 14 has an article at the release zone. If staging conveyor 14 does, the logic proceeds to block 218, the release timer is reset and run, and staging conveyor 14 is selected and released at block 220.

If at block 238, it is determined that staging conveyor 14 does not have an article, the logic proceeds to block 224, then to block 206.

Returning to block 206, if it determined that staging conveyor 13 or 14 is currently selected to be released, the logic proceeds to block 240. At block 240, the release timer state is examined. If it has expired, the logic proceeds to block 242 and the timer is reset and the side release set to none. If at block 240, the release timer state is determined not to be expired, the logic proceeds to block 244, the article is held, and the logic proceeds to block 246. At block 246, the logic determines whether the staging conveyor that has been selected for release is the same side as the most recent staging conveyor released. If it is, the logic updates the release timer at block 248 to the value of the time interval for a same side release, then proceeds to block 240 to check whether the release timer has expired. If at block 246, it is determined that the staging conveyor that has been selected for release is not the same side as the most recent staging conveyor released, the logic updates the release timer at block 250 to the value of the time interval for a different same side release, then proceeds to block 240 to check whether the release timer has expired. It is noted that selection of the time interval is based on whether the previously discharged batch was discharged from the same staging conveyor or a different staging conveyor.

Figure 21:
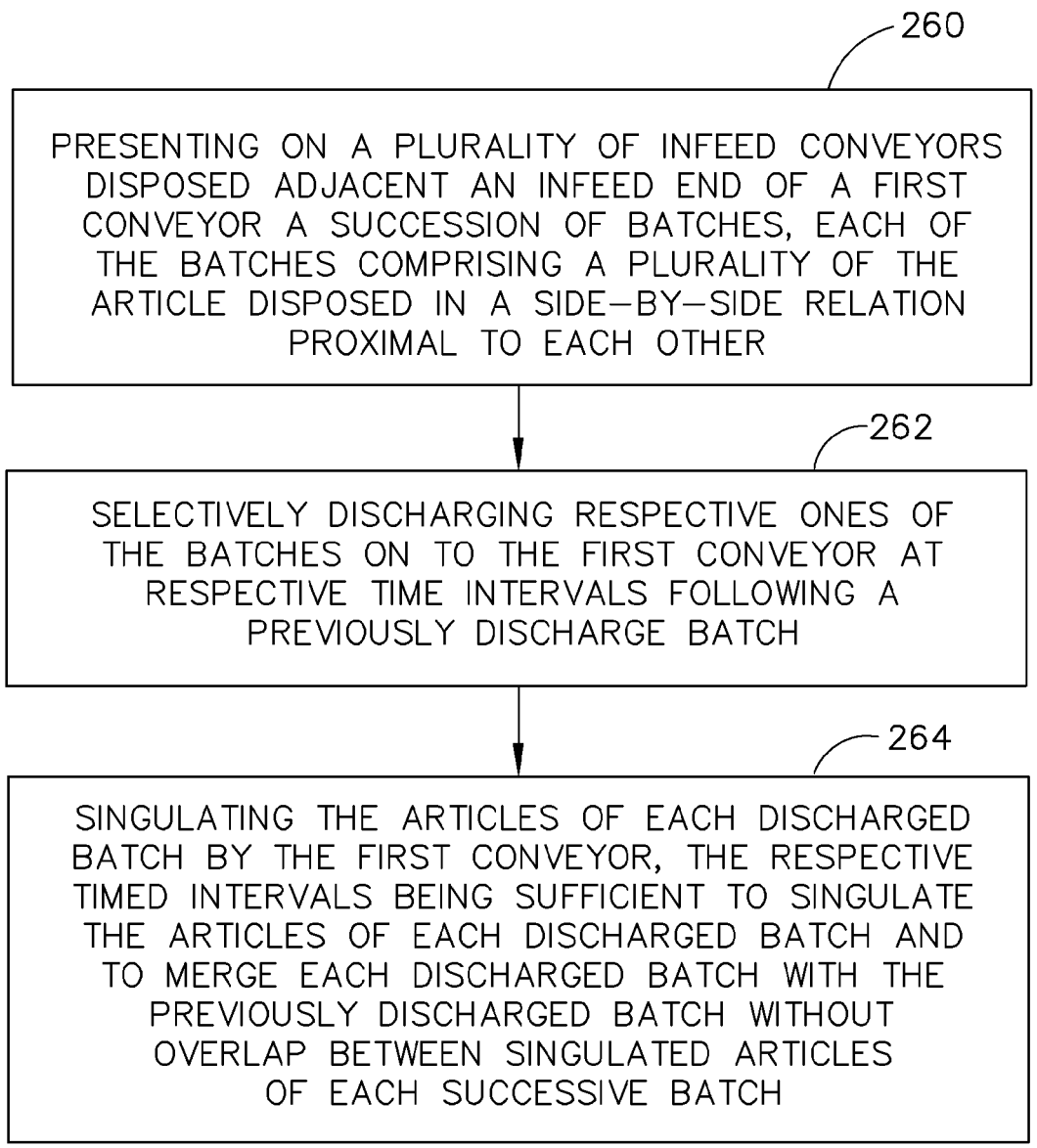
FIG. 21 is a flow diagram of an embodiment of a method for conveying articles.

FIG. 21 is a flow diagram of an embodiment of a method for conveying articles. At block 260, the method comprises presenting on a plurality of infeed conveyors disposed adjacent an infeed end of a first conveyor a succession of batches, each of the batches comprising a plurality of the articles disposed in a side-by-side relation proximal to each other. At block 262, the method comprises selectively discharging respective ones of the batches on to the first conveyor at respective time intervals following a previously discharged batch. At block 264, the method comprises singulating the articles of each discharged batch by the first conveyor, the respective timed intervals being sufficient to singulate the articles of each discharged batch and to merge each discharged batch with the previously discharged batch without overlap between singulated articles of each successive batch.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

EXPLICIT DEFINITIONS

"Based on" means that something is determined at least in part by the thing that it is indicated as being "based on." When something is completely determined by a thing, it will be described as being "based exclusively on" the thing.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The foregoing description of an embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the preferred embodiment, specific terminology was used for the sake of clarity. It is to be understood that each specific term includes all technical equivalents which operate in a similar manner to accomplish a similar purpose. It is intended that the scope of this provisional filing will be better defined by the claims submitted with a later non-provisional filing.

The invention claimed is:

1. A conveyor configured to advance articles m a longitudinal downstream direction, said conveyor comprising:
 a. a first lane extending in said longitudinal downstream direction, said first lane comprising a first upper conveying surface moving at a first speed;

b. a second lane extending in said longitudinal downstream direction, said second lane being spaced apart laterally from said first lane, said second lane comprising a second upper conveying surface moving at a second speed;
c. a third lane extending in said longitudinal downstream direction and interposed between said first and second lanes, said third lane comprising a third upper conveying surface moving at a third speed;
d. a fourth lane extending in said longitudinal downstream direction and interposed between said second and third lanes, said fourth. lane comprising a fourth upper conveying surface moving at a fourth speed;
e. said first upper conveying surface configured to impart a force at at least a first angle relative to the longitudinal downstream direction toward said third lane to articles traveling on said first upper conveying surface;
f. said second upper conveying surface configured to impart a force at a second angle relative to the longitudinal downstream direction toward said fourth lane to articles traveling on said second upper conveying surface;
g. said third conveying surface configured to impart a force at a third angle relative to the longitudinal downstream direction toward said second lane to articles traveling on said third upper conveying surface; and
h. said fourth conveying surface configured to impart a force at a fourth angle relative to the longitudinal downstream direction toward said third lane to articles traveling on said fourth upper conveying surface, the fourth angle being greater than the second angle.

2. The conveyor of claim 1, wherein
a. said first lane comprises a first plurality of rollers which define at least a portion of said first upper conveying surface;
b. said second lane comprises a second plurality of rollers which define at leas portion of said second upper conveying surface;
c. said third lane comprises a third plurality of rollers which define at least a portion of said third upper conveying surface; and
d. said fourth lane comprises a fourth plurality of rollers which define at least a portion of said fourth upper conveying surface.

3. The conveyor of claim 2, wherein
a. said first plurality of rollers are skewed toward said third lane;
b. said second plurality of rollers are skewed toward said fourth lane;
c. said third plurality of rollers are skewed toward said second lane; and
d. said fourth plurality of rollers are skewed toward said third lane.

4. The conveyor of claim 3, Wherein said first plurality of rollers includes at least one first roller interposed between a second roller and a third roller, said at least one first roller being skewed toward said third lane at a first skew angle, said second roller being skewed toward said third lane at a second skew angle, said third roller being skewered toward said third lane at a third skew angle, said first skew angle being greater than said second skew angle and said third skew angle.

5. The conveyor of claim 3, wherein said rollers are wheels.

6. The conveyor of claim 3, wherein said first plurality of rollers are disposed at a first skew angle and said third plurality of rollers are disposed at a third skew angle, said third skew angle being greater than said first skew angle.

7. The conveyor of claim 3, wherein said third plurality of rollers are disposed at a third skew angle and said fourth plurality of rollers are disposed at a fourth skew angle, said third and fourth Skew angles being approximately equal.

8. The conveyor of claim 1, wherein said third speed is greater than said first speed.

9. The conveyor of claim 1, wherein said second speed is greater than said fourth speed.

10. The conveyor of claim 9, wherein said fourth speed is greater than said third speed.

11. The conveyor of claim 10, wherein said third speed is greater than said first speed.

12. A conveyor system configured to advance articles in a downstream direction, said conveyor system comprising:
a. a first conveyor having a first discharge end, said first conveyor configured to discharge a first batch comprising a plurality of side by side articles from said first discharge end;
b. a second conveyor having a second discharge end, said second conveyor configured to discharge a second batch comprising a plurality of side by side articles from said second discharge end;
c. a third conveyor third conveyor having an infeed end and a third discharge end and disposed to receive said first batch and said second batch and discharge said first and second batches from said third discharge end, said third conveyor comprising:
   i. a first lane extending in said downstream direction, said first lane comprising a first upper conveying surface moving at a first speed;
   ii. a second lane extending in said downstream direction, said second lane being spaced apart laterally from said first lane, said second lane comprising a second upper conveying surface moving at a second speed;
   iii. a third lane extending in said downstream direction and interposed between said first and second lanes, said third lane comprising a third upper conveying surface moving at a third speed;
   iv. a fourth lane extending in said downstream direction and interposed between said second and third second lanes, said fourth lane comprising a fourth upper conveying surface moving at a fourth speed;
   v. said first upper conveying surface configured to impart a lateral force toward said third lane to articles traveling on said first upper conveying surface;
   vi. said second upper conveying surface configured to impart a lateral force toward said fourth lane to articles traveling on said second upper conveying surface;
   vii. said third conveying surface configured to impart a lateral force toward said second lane to articles traveling on said third upper conveying surface; and
   viii. said fourth conveying surface configured to impart a lateral force toward said third lane to articles traveling on said fourth upper conveying surface; and
d. a fourth conveyor having a fourth discharge end, said fourth conveyor disposed to receive said first and second batches from said third conveyors and discharge said articles of said first and second batches from said discharge end, said fourth conveyor comprising a descrambler; said third and fourth conveyors being operable to singulate said articles from their initial side by side configuration by the time said articles are discharged from said fourth discharge end,
wherein said second speed is greater than said fourth speed.

13. The conveyor system of claim 12, wherein
a. said first lane comprises a first plurality of rollers which define at least a portion of said first upper conveying surface;

b. said second lane comprises a second plurality of rollers which define at least a portion of said second upper conveying surface;

c. said third lane comprises a third plurality of rollers which define at least a portion of said third upper conveying surface; and d. said fourth lane comprises a fourth plurality of rollers which define at least a portion of said fourth upper conveying surface.

14. The conveyor of claim 13, wherein said first plurality of rollers are disposed at a first skew angle and said third plurality of rollers are disposed at a third skew angle, said third skew angle being greater than said first skew angle.

15. The conveyor system of claim 13, wherein said third plurality of rollers are disposed at a third skew angle and said fourth plurality of rollers are disposed at a fourth skew angle, said third and fourth skew angles being approximately equal.

16. The conveyor system of claim 12, wherein said third speed is greater than said first speed.

17. The conveyor system of claim 12, wherein said fourth speed is greater than said third speed.

18. A method of conveying articles comprising:

presenting on a plurality of infeed conveyors disposed adjacent an infeed end of a first conveyor a succession of batches, each of the batches comprising a plurality of the articles disposed in a side-by-side relation proximal to each other;

selectively discharging respective ones of the batches on to the first conveyor at respective time intervals following a previously discharged batch;

singulating the articles of each discharged batch by the first conveyor, the respective timed intervals being sufficient to singulate the articles of each discharged batch and to merge each discharged batch with the previously discharged batch without overlap between singulated articles of each successive batch, wherein selectively discharging respective ones of batches comprises selecting the respective time interval based on whether the previously discharged batch was discharged from the same infeed conveyor as the infeed conveyor of the batch to be discharged.

19. The method of claim 18, wherein the first conveyor comprises a plurality of conveyors.

20. The method of claim 18, wherein singulating the articles comprises advancing the articles in a downstream direction on the first conveyor by at least a first lane comprising a first plurality of rollers and a second lane comprising a respective second plurality of rollers, the first and second plurality of rollers being skewed in the downstream direction toward each other.

21. The method of claim 20, wherein the first lane defines a first upper conveying surface moving at a first speed, the second lane defines a second upper conveying surface moving at a second speed, said first speed being greater than said second speed.

22. A method of conveying articles comprising:

presenting on a plurality of infeed conveyors disposed adjacent an infeed end of a first conveyor a succession of batches, each of the batches comprising a plurality of the articles disposed in a side-by-side relation proximal to each other;

selectively discharging respective ones of the batches on to the first conveyor at respective time intervals following a previously discharged batch;

singulating the articles of each discharged batch by the first conveyor, the respective timed intervals being sufficient to singulate the articles of each discharged batch and to merge each discharged batch with the previously discharged batch without overlap between singulated articles of each successive batch, wherein selectively discharging respective ones of batches comprises selecting the respective time interval based on whether the previously discharged batch was discharged from the same infeed conveyor as the infeed conveyor of the batch to be discharged.

* * * * *